(12) United States Patent
Ramasubramonian et al.

(10) Patent No.: US 12,526,422 B2
(45) Date of Patent: Jan. 13, 2026

(54) ENTROPY CONTINUATION AND DEPENDENT FRAME ENTROPY CODING IN POINT CLOUD COMPRESSION

(71) Applicant: QUALCOMM Incorporated, San Diego, CA (US)

(72) Inventors: Adarsh Krishnan Ramasubramonian, Irvine, CA (US); Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/641,873

(22) Filed: Apr. 22, 2024

(65) Prior Publication Data
US 2024/0357115 A1    Oct. 24, 2024

Related U.S. Application Data

(60) Provisional application No. 63/497,965, filed on Apr. 24, 2023.

(51) Int. Cl.
*H04N 19/13* (2014.01)
*H04N 19/157* (2014.01)
(Continued)

(52) U.S. Cl.
CPC .......... *H04N 19/13* (2014.11); *H04N 19/157* (2014.11); *H04N 19/172* (2014.11); *H04N 19/174* (2014.11); *H04N 19/597* (2014.11)

(58) Field of Classification Search
CPC .... H04N 19/13; H04N 19/157; H04N 19/172; H04N 19/174; H04N 19/597; H04N 19/70
See application file for complete search history.

(56) References Cited

U.S. PATENT DOCUMENTS

2022/0337872 A1* 10/2022 Park ................. H04N 19/172
2023/0334719 A1* 10/2023 Lee ....................... G06T 9/40

FOREIGN PATENT DOCUMENTS

WO    WO-2024216649 A1 * 10/2024

OTHER PUBLICATIONS

Hao S., et., "[GPCC][New proposal]High Level Syntax Modification on Inter Entropy Continuation", 142. MPEG Meeting, Apr. 24, 2023-Apr. 28, 2023, Antalya, (Motion Picture Expert Group or ISO/IEC JTC1/SC29/WG11), No. m63162, Apr. 19, 2023, 3 Pages, XP030310218, the whole document.

(Continued)

*Primary Examiner* — Francis Geroleo
(74) *Attorney, Agent, or Firm* — QUALCOMM Incorporated

(57) ABSTRACT

A method of encoding or decoding point cloud data includes signaling or parsing a slice level flag of a first slice, in coding order, of a current frame indicating to determine entropy coding states of the first slice of the current frame based on entropy coding states of a last slice, in coding order, of a previous frame of the point cloud data; determining the entropy coding states of the first slice of the current frame based on the entropy coding states of the last slice of the previous frame in a condition where the flag indicates to determine the entropy coding states of the first slice of the current frame based on the entropy coding states of the last slice of the previous frame; and encoding or decoding the first slice of the current frame based on the entropy coding states of the first slice.

18 Claims, 16 Drawing Sheets

(51) Int. Cl.
*H04N 19/172* (2014.01)
*H04N 19/174* (2014.01)
*H04N 19/597* (2014.01)

(56) References Cited

OTHER PUBLICATIONS

International Search Report and Written Opinion—PCT/US2024/025837—ISA/EPO—Jul. 2, 2024 (13 pp).
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
Park Y., et al., "[G-PCC] [New] Dependent Entropy Frame Coding in InterEM", 134. MPEG Meeting, Apr. 26, 2021-Apr. 30, 2021, Online, (Motion Picture Expert Group or ISO/IEC JTC1/SC29/WG11), No. m56590, Apr. 21, 2021, 3 Pages, XP030295083, the whole document.
WG 7-MPEG 3D Graphics and Haptics Coding: "G-PCC 2nd Edition Codec Description", 144. MPEG Meeting, Oct. 16, 2023-Oct. 20, 2023, Hannover; (Motion Picture Expert Group or ISO/IEC JTC1/SC29/WG11), No. n23290 Jan. 20, 2024, 129 Pages, XP030313793, p. 82-p. 85.

\* cited by examiner

ENTROPY CONTINUATION AND DEPENDENT FRAME ENTROPY CODING IN POINT CLOUD COMPRESSION

This application claims the benefit of U.S. Provisional Application No. 63/497,965, filed Apr. 24, 2023, the entire contents of which is incorporated herein by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for entropy continuation and dependent frame entropy coding for point cloud compression. A point cloud encoder may be configured to entropy encode and a point cloud decoder may be configured to entropy decode information that the point cloud encoder signals and that the point cloud decoder parses. In one or more examples, the point cloud encoder may signal and the point cloud decoder may parse a slice level flag that indicates whether entropy coding states (e.g., contexts) for a first slice, in coding order, of a current frame are determined based on entropy coding states of a last slice, in coding order, of a previous frame. Based on the flag, the point cloud decoder may determine entropy coding states of the first slice of the current frame based on the entropy coding states of the last slice of the previous frame, and entropy decode information for the first slice based on the entropy coding states of the first slice.

Using the example slice level flag allows for entropy coding states determination for a first slice of a current frame based on entropy coding states of a last slice of a previous frame in a manner that allows for standard compatibility and minimizes design pitfalls if slices or frames are lost during transmission or reception. Accordingly, the example techniques allow for the point cloud encoder and the point cloud decoder to determine the entropy coding states for the first slice of the current frame that results in more efficient entropy encoding and decoding compared to resetting the entropy coding states at the beginning of every frame. For instance, the entropy coding states at the end of encoding or decoding the last slice of the previous frame may be better initial entropy coding states, in terms of coding efficiency, for the first slice of the current frame, as compared to resetting the entropy coding states.

In one example, the disclosure describes a method of encoding or decoding point cloud data, the method comprising: signaling or parsing a slice level flag of a first slice, in coding order, of a current frame of the point cloud data indicating to determine entropy coding states of the first slice of the current frame based on entropy coding states of a last slice, in coding order, of a previous frame of the point cloud data; determining the entropy coding states of the first slice of the current frame based on the entropy coding states of the last slice of the previous frame in a condition where the flag indicates to determine the entropy coding states of the first slice of the current frame based on the entropy coding states of the last slice of the previous frame; and encoding or decoding the first slice of the current frame based on the entropy coding states of the first slice.

In one example, the disclosure describes a device for encoding or decoding point cloud data, the device comprising: one or more memories configured to store the point cloud data; and processing circuitry coupled to the one or more memories, wherein the processing circuitry is configured to: signal or parse a slice level flag of a first slice, in coding order, of a current frame of the point cloud data indicating to determine entropy coding states of the first slice of the current frame based on entropy coding states of a last slice, in coding order, of a previous frame of the point cloud data; determine the entropy coding states of the first slice of the current frame based on the entropy coding states of the last slice of the previous frame in a condition where the flag indicates to determine the entropy coding states of the first slice of the current frame based on the entropy coding states of the last slice of the previous frame; and encode or decode the first slice of the current frame based on the entropy coding states of the first slice.

In one example, the disclosure describes a computer-readable storage medium storing instructions thereon that when executed cause one or more processors to: signal or parse a slice level flag of a first slice, in coding order, of a current frame of point cloud data indicating to determine entropy coding states of the first slice of the current frame based on entropy coding states of a last slice, in coding order, of a previous frame of the point cloud data; determine the entropy coding states of the first slice of the current frame based on the entropy coding states of the last slice of the previous frame in a condition where the flag indicates to determine the entropy coding states of the first slice of the current frame based on the entropy coding states of the last slice of the previous frame; and encode or decode the first slice of the current frame based on the entropy coding states of the first slice.

The details of one or more examples are set forth in the accompanying drawings and the description below. Other features, objects, and advantages will be apparent from the description, drawings, and claims.

DETAILED DESCRIPTION

Figure 1:
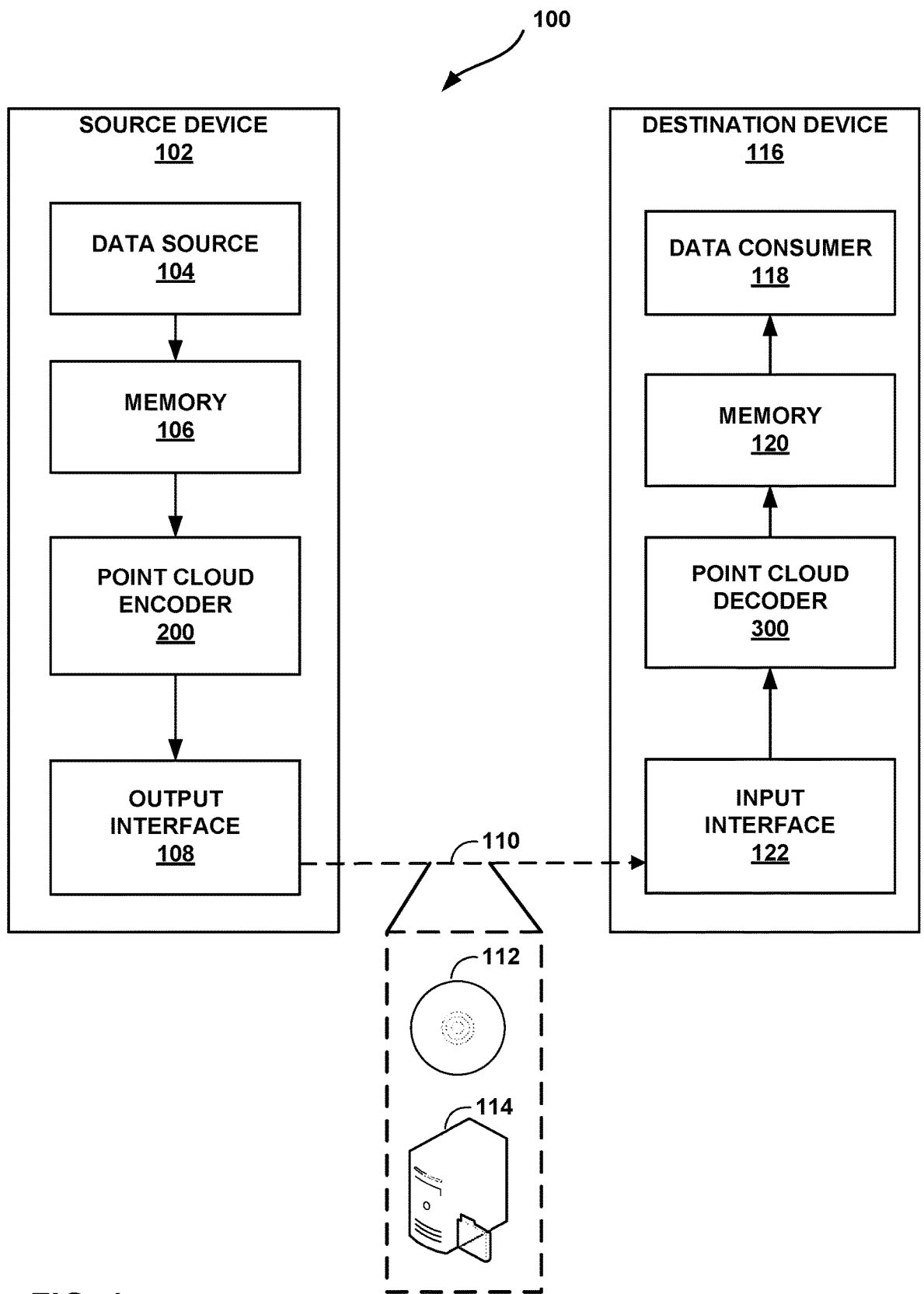
FIG. 1 is a block diagram illustrating an example encoding and decoding system that may perform the techniques of this disclosure.

Point cloud data includes data for processing a point cloud. A point cloud is represented by a plurality of points. A point cloud encoder may arrange the points in a frame, and encode the point cloud data of the points. Examples of the point cloud data includes geometry data (e.g., geometric location of the points) and attribute data (e.g., color, opacity, reflectance, etc.). A point cloud decoder receives the point cloud data and decodes the point cloud data to reconstruct the frame, and the point cloud.

One example way to encode and decode the point cloud data is using entropy coding techniques. In entropy coding techniques, the point cloud encoder and the point cloud decoder determine entropy coding states (e.g., contexts or context values) for the data, and entropy encode or decoder the data based on the entropy coding states. In general, the entropy coding states are based on previously encoded or decoded data (e.g., information used to encode or decode a previous point) since there may be correlation between the manner in which the point cloud encoder or decoder encoded or decoded previous data and the manner in which the point cloud encoder or decoder is to encode or decode current data.

In some examples, a frame is divided into one or more slices. To encode or decode the one or more slices, the point cloud encoder and the point cloud decoder may determine entropy coding states for a slice (e.g., determine initial entropy coding states). As the point cloud encoder or point cloud decoder encodes or decodes a slice, the point cloud encoder or point cloud decoder may keep updating the entropy coding states (e.g., based on recently encoded or decoded points).

In some techniques, after encoding or decoding a slice, the point cloud encoder and the point cloud decoder reset the entropy coding states back to default entropy coding states, and start encoding or decoding a next slice using the default entropy coding states as the initial entropy coding states. However, there may be coding inefficiencies in resetting the entropy coding states. For example, the entropy coding states of a previous slice, in coding order, may be better initial entropy coding states than the default entropy coding states.

For instance, for a current slice in a current frame, the entropy coding states may be based on the entropy coding states of a previous slice in the same, current frame. As another example, for a current slice in a current frame, such as where the current slice is a first slice, in coding order, in the current frame, the entropy coding states may be based on the entropy coding states of a last slice, in coding order, of a previous frame.

This disclosure describes examples techniques to indicate whether a point cloud decoder, for a first slice, in coding order, in a current frame, is to determine entropy coding states of the first slice based on entropy coding states of a last slice, in coding order, of a previous frame. For instance, there may be a high-level flag (e.g., signaled in a parameter set), applicable to one or more frames, that indicates whether determining entropy coding states for a slice in a current frame based on a slice in a previous frame is enabled. That is, the high-level flag may indicate whether dependent frame entropy coding is enabled or disabled for one or more frames.

In accordance with one or more examples described in this disclosure, the point cloud encoder may signal and a point cloud decoder may parse a slice level flag (e.g., a flag in a slice header) that indicates whether the entropy coding states for that particular slice (e.g., the slice for which the slice level flag is signaled) are to be determined based on the entropy coding states of a last slice of a previous frame. For instance, the point cloud encoder may signal and the point cloud decoder may parse the slice_dep_entr_cont flag for a slice. The point cloud decoder may determine the entropy coding states (e.g., initial entropy coding states) for a first slice in a current frame based on the entropy coding states of a last slice in a previous frame.

For all other slices in the current frame, the slice_dep_entr_cont flag may be set to false (e.g., no other slice in the current frame should determine initial entropy coding states based on entropy coding states of the last slice of the previous frame). Furthermore, if the high-level flag indicates that dependent frame entropy coding is disabled for one or more frames, then the point cloud encoder may not signal and the point cloud decoder may not parse the slice_dep_entr_cont flag for any of the slices in the current frame.

In the above examples, slice_dep_entr_cont flag indicates whether entropy coding states for a slice in a current frame is based on entropy coding states of a slice in a previous frame. There may be examples where the entropy coding states of a slice in the current frame is based on the entropy coding states of a previous slice in the same frame.

Similar to above, there may be a high-level flag, signaled in a parameter set, that indicates whether slice entropy continuation is enabled or disabled for one or more frames. Slice entropy continuation being enabled for one or more frames may mean that it is possible for the entropy coding states for a slice in a current frame to be based on the entropy coding states of a previous slice in the same current frame. Slice entropy continuation being disabled for one or more frames may mean that it is not possible for the entropy coding states for a slice in a current frame to be based on the entropy coding states of a previous slice in the same current frame.

In one or more examples, the point cloud encoder may signal and a point cloud decoder may parse a slice level flag (e.g., a flag in a slice header) that indicates whether the entropy coding states for that particular slice (e.g., the slice for which the slice level flag is signaled) are to be determined based on the entropy coding states of previous slice in the same frame. For instance, the point cloud encoder may signal and the point cloud decoder may parse the slice_entropy_continuation flag for a slice. The point cloud decoder may determine the entropy coding states (e.g., initial entropy coding states) for a slice in a current frame based on the entropy coding states of a previous slice in the current frame.

By having different slice level flags, one for whether a point cloud decoder, for a slice, is to use entropy coding states of a last slice of a previous frame, and another for whether a point cloud decoder, for a slice, is to use entropy coding states of a previous slice in the same frame, the example techniques may improve the overall point cloud data encoding and decoding functionality. For example, if only high-level flags are used, without slice level flags, there may scenarios where entropy continuation is disabled (e.g., using entropy coding states of a previous slice in same frame) but dependent frame entropy coding is enabled (e.g., using entropy coding states of a slice in a previous frame). This can lead to implementation issues as the different high-level flags are inconsistent, as described in more detail. With the example slice level flags described in this disclosure, the possibility of implementation issues may be reduced resulting in better encoding and decoding performance.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a point cloud encoder 200 (e.g., G-PCC encoder or other types of encoder), and an output interface 108. Destination device 116 includes an input interface 122, a point cloud decoder (e.g., G-PCC decoder or other types of decoder), a memory 120, and a data consumer 118. In accordance with this disclosure, Point cloud encoder 200 of source device 102 and point cloud decoder 300 of destination device 116 may be configured to apply the techniques of this disclosure related to predictive geometry coding for point cloud compression, such specifying whether parsing of azimuth residual is independent on (e.g., of) the values of reconstructed syntax elements and/or parsing of syntax structures (e.g., slice or brick) is independent of decoding/reconstruction of one or more components of one or more points in the point cloud. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to predictive geometry coding for point cloud compression, such specifying whether parsing of azimuth residual is independent on (e.g., of) the values of reconstructed syntax elements and/or parsing of syntax structures (e.g., slice or brick) is independent of decoding/reconstruction of one or more components of one or more points in the point cloud. Source device 102 and destination device 116 are merely examples of such devices in which source device 102 generates coded data for transmission to destination device 116. This disclosure refers to a "coding" device as a device that performs coding (encoding and/or decoding) of data. Thus, point cloud encoder 200 and point cloud decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to point cloud encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, point cloud encoder 200 encodes the captured, pre-captured, or computer-generated data. Point cloud encoder 200 may rearrange the frames from the received order (sometimes referred to as "display order") into a coding order for coding. Point cloud encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from point cloud decoder 300. Additionally or alternatively, memory 106 and memory 120 may store software instructions executable by, e.g., point cloud encoder 200 and point cloud decoder 300, respectively.

Although memory 106 and memory 120 are shown separately from point cloud encoder 200 and point cloud decoder 300 in this example, it should be understood that point cloud encoder 200 and point cloud decoder 300 may also include internal memories for functionally similar or equivalent purposes.

Furthermore, memory 106 and memory 120 may store encoded data, e.g., output from point cloud encoder 200 and input to point cloud decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to point cloud encoder 200 and/or output interface 108, and destination device 116 may include an SoC device to perform the functionality attributed to point cloud decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by point cloud encoder 200, which is also used by point cloud decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

Point cloud encoder 200 and point cloud decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium or media and execute the instructions in hardware using one or more processors to perform the techniques of this disclosure. A computer-readable medium or media may be a single memory component or may be distributed. Each of point cloud encoder 200 and point cloud decoder 300 may be included in one or more encoders or decoders, either of which may be integrated as part of a combined encoder/decoder (CODEC) in a respective device. A device including point cloud encoder 200 and/or point cloud decoder 300 may comprise one or more integrated circuits, microprocessors, and/or other types of devices.

Point cloud encoder 200 and point cloud decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data.

An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, point cloud encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in Text of ISO/IEC FDIS 23090-9 Geometry-based Point Cloud Compression, ISO/IEC JTC 1/SC29/WG 7 m55637, Teleconference, October 2020, and a description of the codec is available in G-PCC Codec Description, ISO/IEC JTC 1/SC29/WG 7 MDS20983, Teleconference, October 2021.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
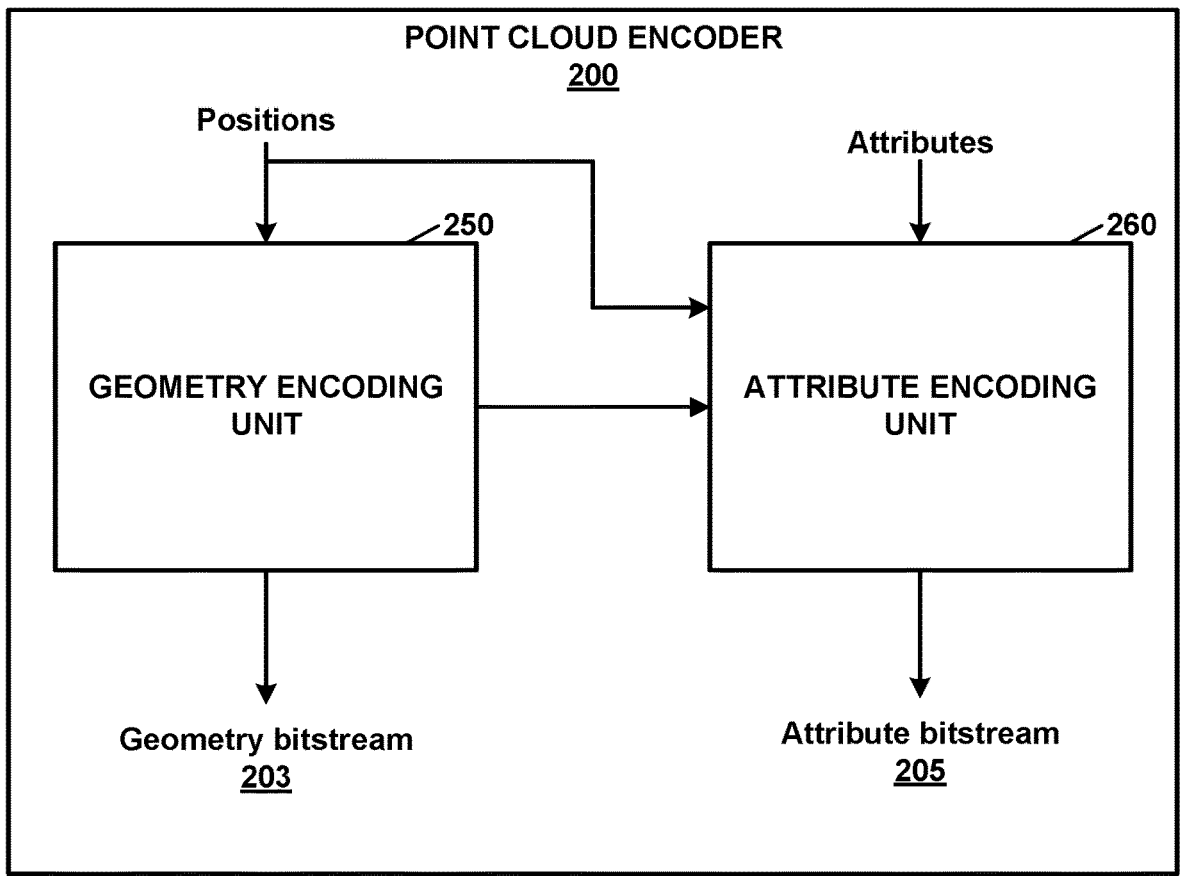
FIG. 2 is a block diagram illustrating an example Geometry Point Cloud Compression (G-PCC) encoder.
Figure 3:
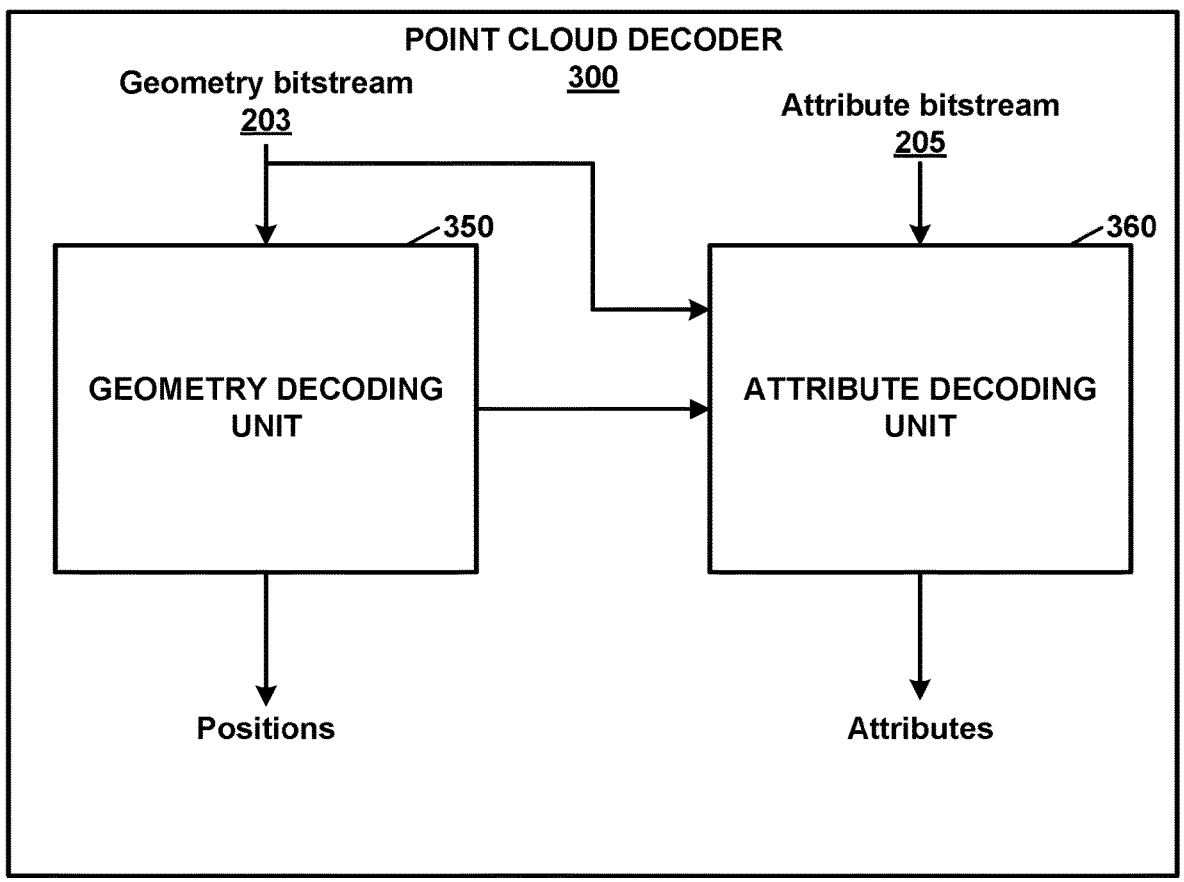
FIG. 3 is a block diagram illustrating an example G-PCC decoder.

FIG. 2 provides an overview of point cloud encoder 200. FIG. 3 provides an overview of point cloud decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11). In the example of FIG. 2, point cloud encoder 200 may include a geometry encoding unit 250 and an attribute encoding unit 260. In general, geometry encoding unit 250 is configured to encode the positions of points in the point cloud frame to produce geometry bitstream 203. Attribute encoding unit 260 is configured to encode the attributes of the points of the point cloud frame to produce attribute bitstream 205. As will be explained below, attribute encoding unit 260 may also use the positions, as well as the encoded geometry from geometry encoding unit 250 to encode the attributes.

In the example of FIG. 3, point cloud decoder 300 may include a geometry decoding unit 350 and an attribute decoding unit 360. In general, geometry encoding unit 350 is configured to decode the geometry bitstream 203 to recover the positions of points in the point cloud frame. Attribute decoding unit 360 is configured to decode the attribute bitstream 205 to recover the attributes of the points of the point cloud frame. As will be explained below, attribute decoding unit 360 may also use the positions from the decoded geometry from geometry decoding unit 350 to 3ncode the attributes.

In both point cloud encoder 200 and point cloud decoder 300, point cloud positions are coded first. Attribute coding depends on the decoded geometry. In FIGS. 4-7 of this disclosure, the coding units with vertical hashing are options typically used for Category 1 data. Diagonal-crosshatched coding units are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Figure 8:
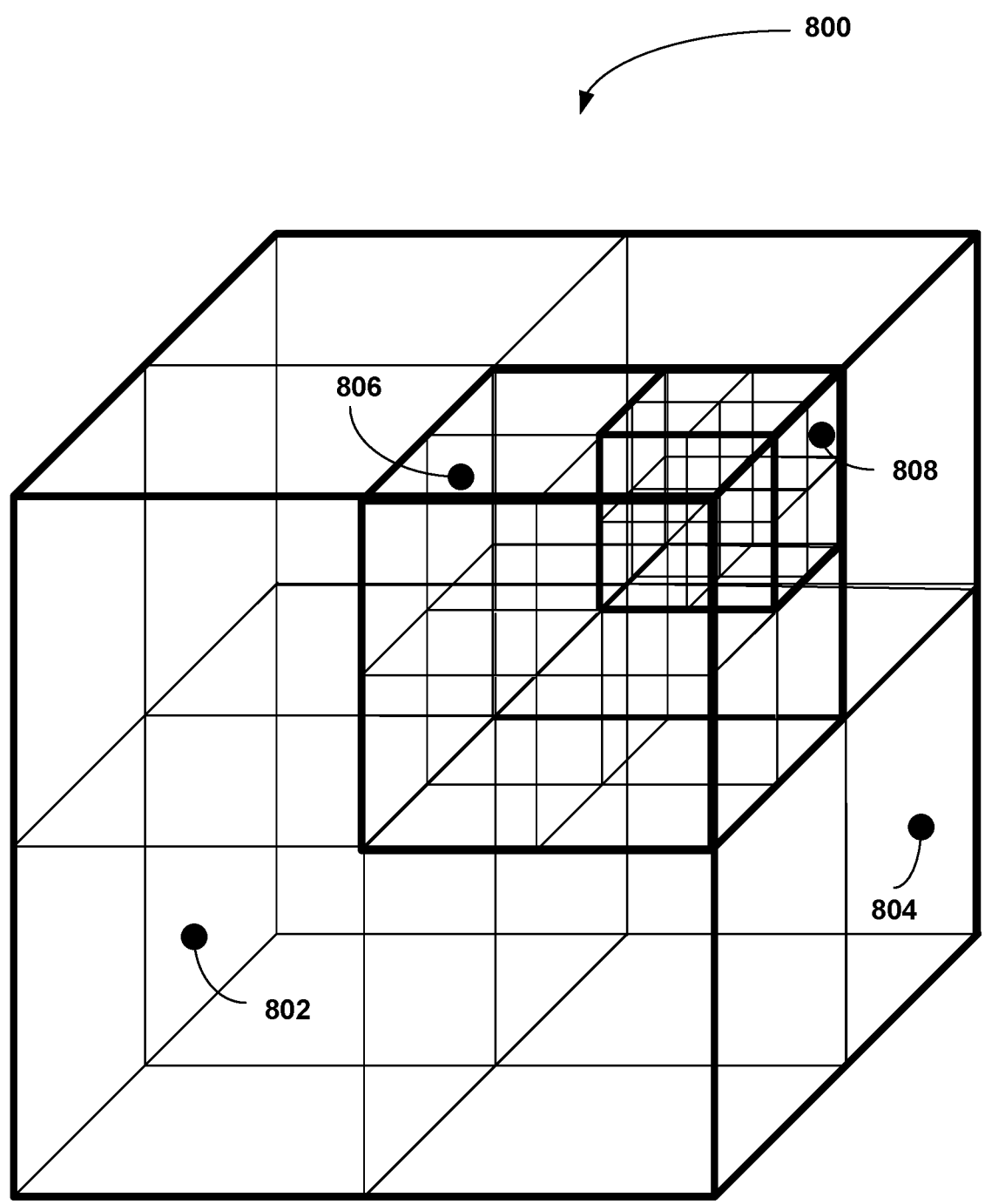
FIG. 8 is a conceptual diagram illustrating an example octree split for geometry coding.

FIG. 8 is a conceptual diagram illustrating an example octree split for geometry coding. For instance, FIG. 8 illustrates octree split 800. There are points 802-808 at different levels within octree split 800, as illustrated.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LoD), where with each level of detail a finer representation of the point cloud attribute may be obtained. Each level of detail may be specified based on distance metric from the neighboring nodes or based on a sampling distance.

At point cloud encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

Point cloud encoder 200 and point cloud decoder 300 may be configured to code point cloud data using predictive geometry coding as an alternative to the octree geometry coding. In prediction tree coding, the nodes of the point cloud are arranged in a tree structure (which defines the prediction structure), and various prediction strategies are used to predict the coordinates of each node in the tree with respect to its predictors.

Figure 14:
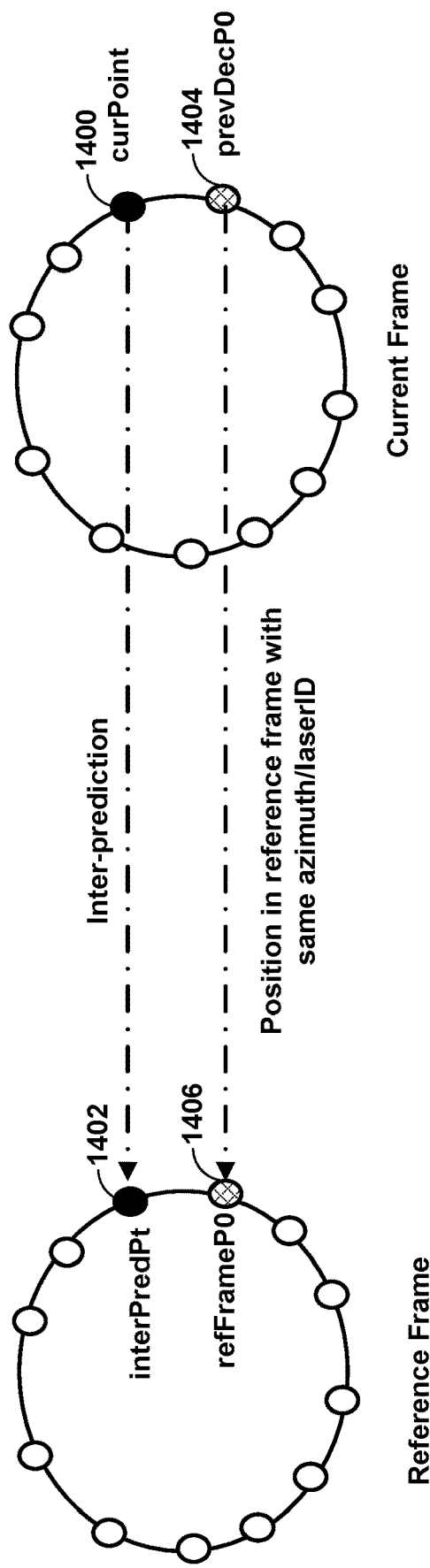
FIG. 14 is a conceptual diagram illustrating an example of inter-prediction of a current point (curPoint) from a point (interPredPt) in a reference frame.

A method is illustrated in FIG. 14. FIG. 14 is a conceptual diagram illustrating an example of inter-prediction of a current point (curPoint) 1400 in a current frame from a point (interPredPt) 1402 in the reference frame. The extension of inter prediction to azimuth, radius, and laserID may include the following steps:

For a given point, choose the previous decoded point (prevDecP0) 1404.

Choose a position point (refFrameP0) 1406 in the reference frame that has same scaled azimuth and laserID as prevDecP0 1404.

In the reference frame, find the first point (interPredPt) 1402 that has azimuth greater than that of refFrameP0 1406. The point interPredPt 1402 may also be referred to as the "Next" inter predictor.

Figure 4:
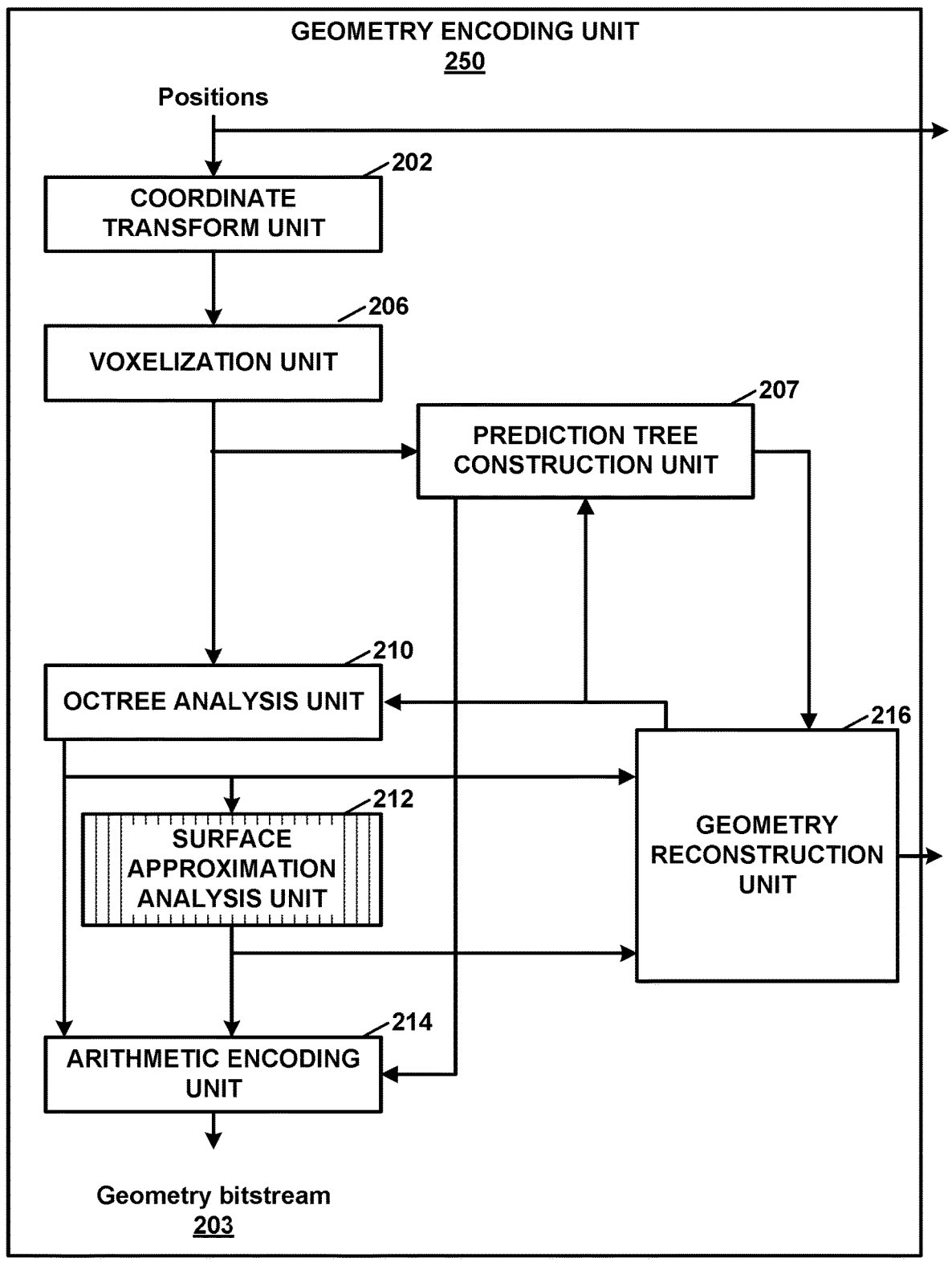
FIG. 4 is a block diagram illustrating an example geometry encoding unit of FIG. 2 in more detail.

FIG. 4 is a block diagram illustrating an example of geometry encoding unit 250 of FIG. 2 in more detail. Geometry encoding unit 250 may include a coordinate transform unit 202, a voxelization unit 206, a predictive tree construction unit 207, an octree analysis unit 210, a surface approximation analysis unit 212, an arithmetic encoding unit 214, and a geometry reconstruction unit 216.

As shown in the example of FIG. 4, geometry encoding unit 250 may obtain a set of positions of points in the point cloud. In one example, geometry encoding unit 250 may obtain the set of positions of the points in the point cloud and the set of attributes from data source 104 (FIG. 1). The positions may include coordinates of points in a point cloud. Geometry encoding unit 250 may generate a geometry bitstream 203 that includes an encoded representation of the positions of the points in the point cloud.

Coordinate transform unit 202 may apply a transform to the coordinates of the points to transform the coordinates from an initial domain to a transform domain. This disclosure may refer to the transformed coordinates as transform coordinates. Voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point.

Prediction tree construction unit 207 may be configured to generate a prediction tree based on the voxelized transform coordinates. Prediction tree construction unit 207 may be configured to perform any of the prediction tree coding techniques described above, either in an intra-prediction mode or an inter-prediction mode. In order to perform prediction tree coding using inter-prediction, prediction tree construction unit 207 may access points from previously-encoded frames from geometry reconstruction unit 216. Arithmetic encoding unit 214 may entropy encode syntax elements representing the encoded prediction tree.

Instead of performing prediction tree based coding, geometry encoding unit 250 may perform octree based coding. Octree analysis unit 210 may generate an octree based on the voxelized transform coordinates. Surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. Geometry encoding unit 250 may output these syntax elements in geometry bitstream 203. Geometry bitstream 203 may also include other syntax elements, including syntax elements that are not arithmetically encoded.

Octree-based coding may performed either as intra-prediction techniques or inter-prediction techniques. In order to perform octree tree coding using inter-prediction, octree analysis unit 210 and surface approximation analysis unit 212 may access points from previously-encoded frames from geometry reconstruction unit 216.

Geometry reconstruction unit 216 may reconstruct transform coordinates of points in the point cloud based on the octree, the predictive tree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points.

Figure 5:
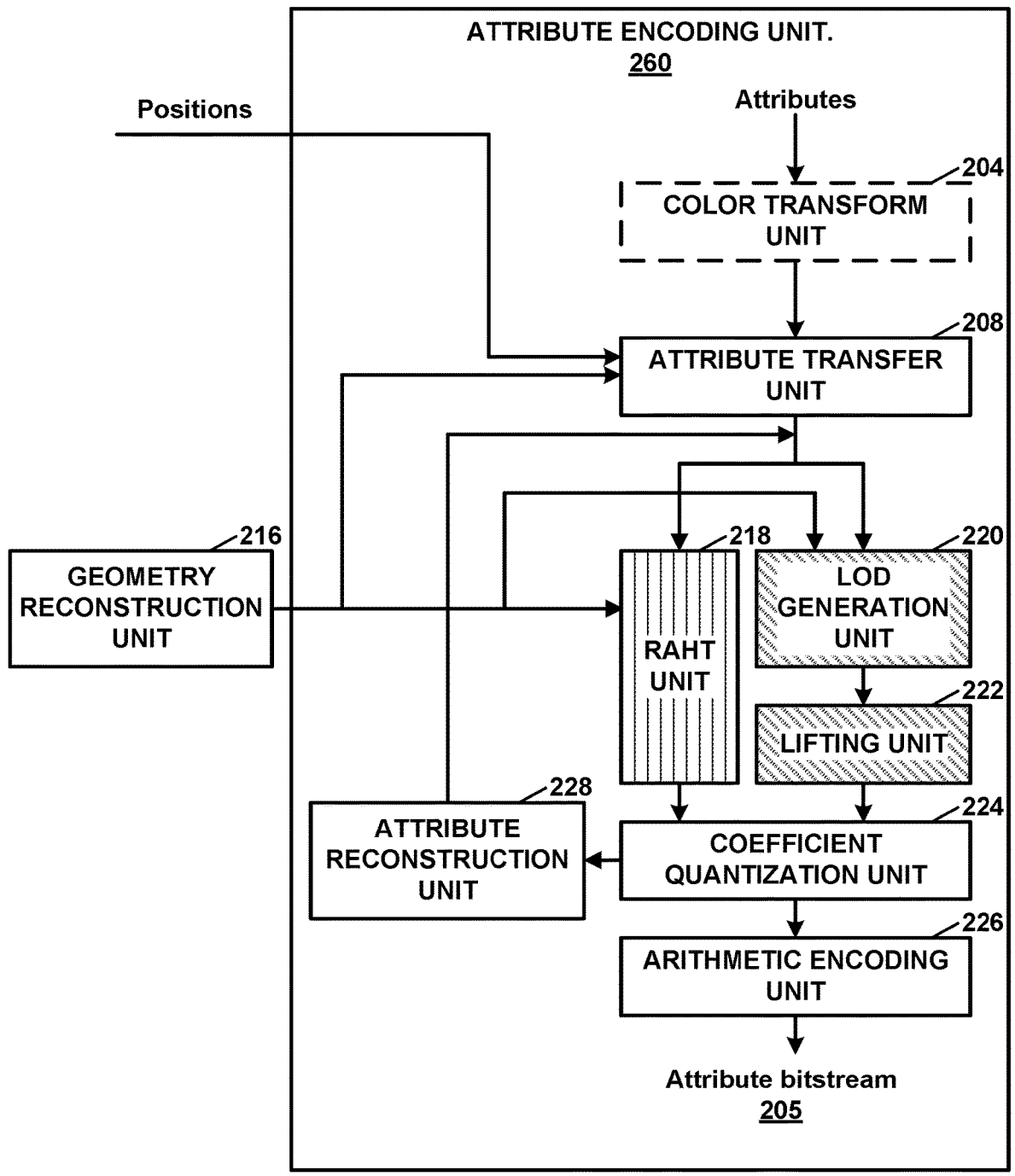
FIG. 5 is a block diagram illustrating an example attribute encoding unit of FIG. 2 in more detail.

FIG. 5 is a block diagram illustrating an example of attribute encoding unit 260 of FIG. 2 in more detail. Attribute encoding unit 250 may include a color transform unit 204, an attribute transfer unit 208, an RAHT unit 218, a LoD generation unit 220, a lifting unit 222, a coefficient quantization unit 224, an arithmetic encoding unit 226, and an attribute reconstruction unit 228. Attribute encoding unit 260 may encode the attributes of the points of a point cloud to generate an attribute bitstream 205 that includes an encoded representation of the set of attributes. The attributes may include information about the points in the point cloud, such as colors associated with points in the point cloud.

Color transform unit 204 may apply a transform to transform color information of the attributes to a different domain. For example, color transform unit 204 may transform color information from an RGB color space to a YCbCr color space. Attribute transfer unit 208 may transfer attributes of the original points of the point cloud to reconstructed points of the point cloud. Attribute transfer unit 208 may use the original positions of the points as well as the positions generated from attribute encoding unit 250 (e.g., from geometry reconstruction unit 216) to make the transfer.

RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LoD generation unit 220 and lifting unit 222 may apply LoD processing and lifting, respectively, to the attributes of the reconstructed points. LoD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LoD1 is obtained based on refinement level RL1, LoD2 is obtained based on RL1 and RL2, . . . LoDN is obtained by union of RL1, RL2, . . . . RLN. In some cases, LoD generation may be followed by a prediction scheme (e.g., predicting transform) where attributes associated with each point in the LoD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. Point cloud encoder 200 may output these syntax elements in attribute bitstream 205. Attribute bitstream 205 may also include other syntax elements, including non-arithmetically encoded syntax elements.

Like geometry encoding unit 250, attribute encoding unit 260 may encode the attributes using either intra-prediction or inter-prediction techniques. The above description of attribute encoding unit 260 generally describes intra-prediction techniques. In other examples, RAHT unit 215, LoD generation unit 220, and/or lifting unit 222 may also use attributes from previously-encoded frames to further encode the attributes of the current frame. In this regard, attribute reconstructions unit 228 may be configured to reconstruct the encoded attributes and store them for possible future use in inter-prediction encoding.

Figure 6:
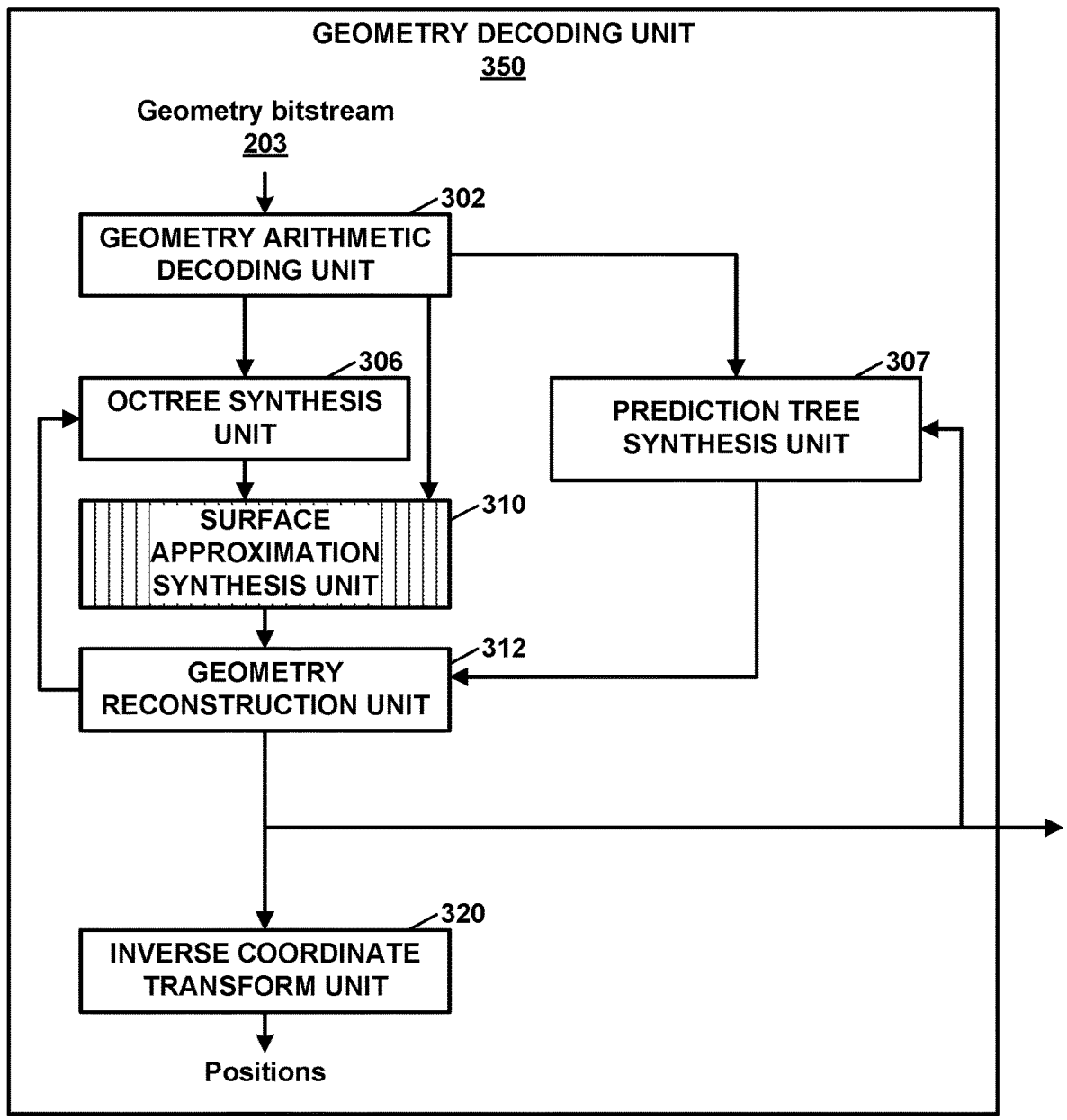
FIG. 6 is a block diagram illustrating an example geometry decoding unit of FIG. 3 in more detail.

FIG. 6 is a block diagram illustrating an example geometry decoding unit 350 of FIG. 3 in more detail. Geometry decoding unit 350 may be configured to perform the reciprocal process to that performed by geometry encoding unit 250 of FIG. 4. Geometry decoding unit 350 receives geometry bitstream 203 and produces positions of the points of a point cloud frame. Geometry decoding unit 350 may include a geometry arithmetic decoding unit 302, an octree synthesis unit 306, a prediction tree synthesis unit 307, a surface approximation synthesis unit 310, a geometry reconstruction unit 312, and an inverse coordinate transform unit 320.

Geometry decoding unit 350 may receive geometry bitstream 203. Geometry arithmetic decoding unit 302 may apply arithmetic decoding (e.g., Context-Adaptive Binary Arithmetic Coding (CABAC) or other type of arithmetic decoding) to syntax elements in geometry bitstream 203.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level.

At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Octree-based coding may performed either as intra-prediction techniques or inter-prediction techniques. In order to perform octree tree coding using inter-prediction, octree synthesis unit 306 and surface approximation synthesis unit 310 may access points from previously-decoded frames from geometry reconstruction unit 312.

Prediction tree synthesis unit may synthesize a prediction tree based on syntax elements parsed from geometry bitstream 203. Prediction tree synthesis unit 307 may be configured to synthesize the prediction tree using any of the techniques described above, including using both intra-prediction techniques or intra-prediction techniques. In order to perform prediction tree coding using inter-prediction, prediction tree synthesis unit 307 may access points from previously-decoded frames from geometry reconstruction unit 312.

Geometry reconstruction unit 312 may perform a reconstruction to determine coordinates of points in a point cloud.

For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Figure 7:
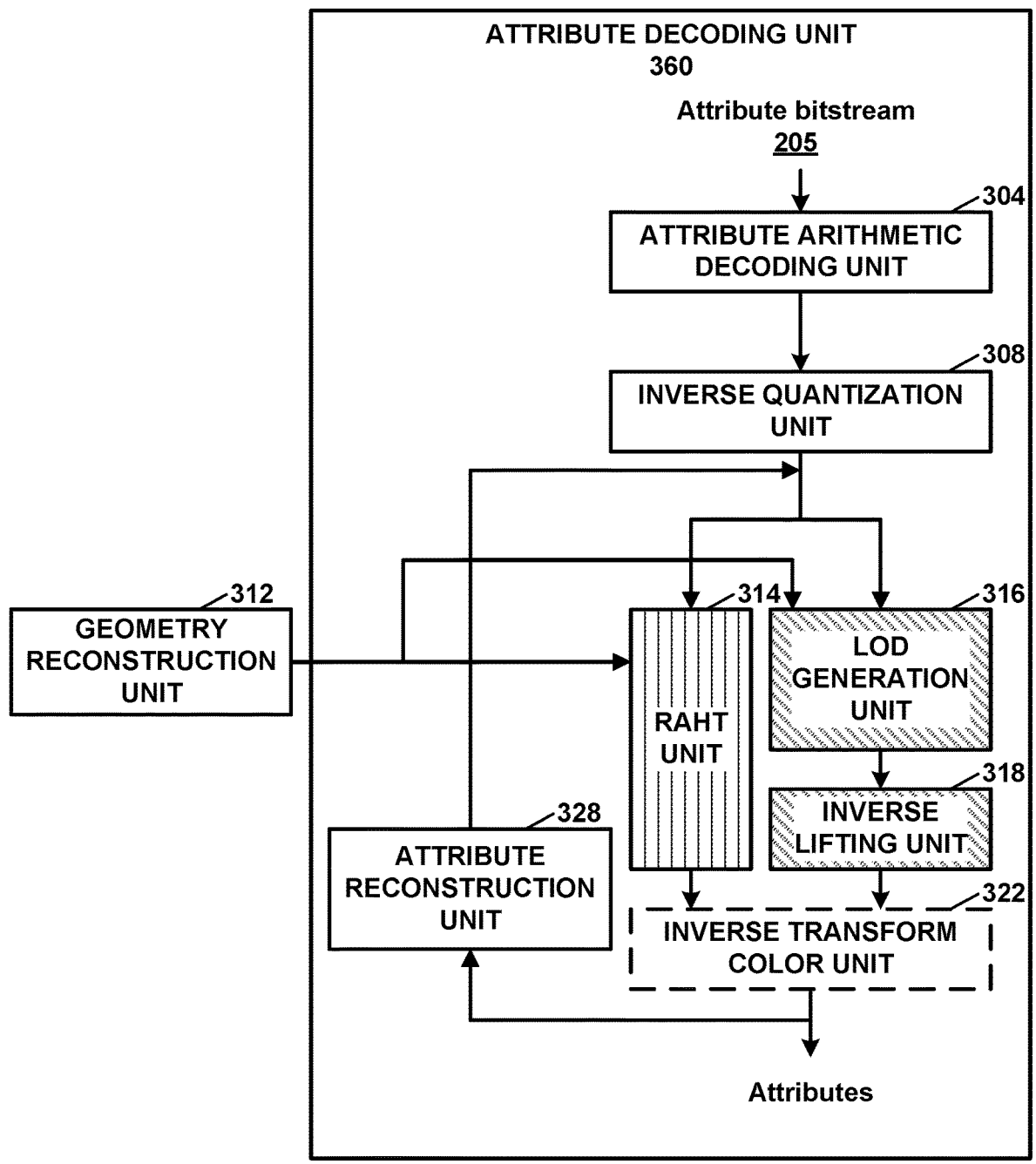
FIG. 7 is a block diagram illustrating an example attribute decoding unit of FIG. 3 in more detail.

FIG. 7 is a block diagram illustrating an example attribute decoding unit 360 of FIG. 3 in more detail. Attribute decoding unit 360 may be configured to perform the reciprocal process to that performed by attribute encoding unit 260 of FIG. 5. Attribute decoding unit 360 receives attribute bitstream 205 and produces attributes of the points of a point cloud frame. Attribute decoding unit 356 may include an attribute arithmetic decoding unit 304, an inverse quantization unit 308, a RAHT unit 314, an LoD generation unit 316, an inverse lifting unit 318, an inverse transform color unit 322, and an attribute reconstruction unit 328.

Attribute arithmetic decoding unit 304 may apply arithmetic decoding to syntax elements in attribute bitstream 205. Inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at point cloud encoder 200. Alternatively, LoD generation unit 316 and inverse lifting unit 318 may determine color values for points of the point cloud using a level of detail-based technique. LoD generation unit 316 decodes each LoD giving progressively finer representations of the attribute of points. With a predicting transform, LoD generation unit 316 derives the prediction of the point from a weighted sum of points that are in prior LoDs, or previously reconstructed in the same LoD. LoD generation unit 316 may add the prediction to the residual (which is obtained after inverse quantization) to obtain the reconstructed value of the attribute. When the lifting scheme is used, LoD generation unit 316 may also include an update operator to update the coefficients used to derive the attribute values. LoD generation unit 316 may also apply an inverse adaptive quantization in this case.

Furthermore, in the example of FIG. 7, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YcbCr color space to the RGB color space.

Attribute reconstruction unit 328 may be configured to store attributes from previously-decoded frames. Attribute coding may performed either as intra-prediction techniques or inter-prediction techniques. In order to perform attribute decoding using inter-prediction, RAHT unit 314 and/or LoD generation unit 316 may access attributes from previously-decoded frames from attribute reconstruction unit 328.

The various units of FIGS. 4-7 are illustrated to assist with understanding the operations performed by point cloud encoder 200 and point cloud decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

The following describes slice entropy continuation. Typically, when a slice is coded, the entropy coding states (of the various bins that are entropy coded) are reset (e.g., to default values) before the coding of the subsequent slice. The entropy coding states may also be referred to as contexts or context values. The resetting may allow slices to be parsed and coded independently. However, this resetting of entropy coding states may result in a loss in the coding efficiency, which may be one of the costs of having slices. Entropy continuation is a technique by which the entropy coding states of a first slice may be copied from a second slice, where the second slice is a previous slice in coding order. In such cases, the coding of the first slice may be dependent on the coding of the second slice.

In applications where slices may be lost, this dependence could impact the coding efficiency. For example, if the second slice is lost, the first slice may not be decodable even when the first slice is received. However, in other applications where the probability of loss of slices is small, entropy continuation can provide a balanced performance trade-off: (a) as the entropy coding states of slices may be copied from another slice, impact on coding efficiency may not be as significant as otherwise; (b) under entropy continuation, only the entropy encoding and/or decoding of slices is dependent; subsequent decoding of slices may still be performed independently which provides some flexibility for parallel implementation.

In G-PCC, a flag (e.g., a high-level entropy continuation flag) is signaled in the geometry parameter set (GPS) to indicate whether entropy continuation is enabled. The high-level entropy continuation flag signaled in the GPS may be applicable to one or more frames, and therefore is consider a high-level flag.

When enabled, entropy coding of one or more slices of a frame may depend on the entropy coding state of another slice in the same frame. This may be indicated by a second flag in each slice. The second flag may be referred to as the slice_entropy_continuation flag. That is, the slice_entropy- _continuation flag may be a slice level flag (e.g., signaled in the slice header or elsewhere) that is applicable to that slice. Hence, the high-level entropy continuation flag for entropy continuation may indicate whether entropy continuation (e.g., entropy coding states for one slice in current frame can be based on entropy coding states of another slice in the same frame) is allowable for slices in a frame, and slice_entropy_continuation flag may indicate whether entropy continuation is enabled for a particular slice associated with the slice_entropy_continuation flag.

In G-PCC, for entropy continuation, when a first slice is indicated to determine (e.g., based on copying) entropy states from a second slice, point cloud encoder 200 signals a prev_slice_id which indicates the slice ID of the second slice. This enables point cloud decoder 300 to determine whether the first slice can be entropy decoded. If point cloud decoder 300 did not receive the slice with ID prev_slice_id (i.e., the second slice), the point cloud decoder 300 may determine that point cloud decoder 300 cannot decode the first slice. This determination allows the point cloud decoder 300 to avoid wasting resources (in trying to decode the slice). The point cloud decoder 300 may also take other measures-error recovery for the lost/non-decodable slices, or request the encoder side/transmitter to resend the second slice.

G-PCC may also have other constraints. Under entropy continuation, the first slice, in coding order, of a frame cannot copy the entropy coding states from other slices. In other words, entropy continuation of slices may be only between slices of a same frame. However, as described in more detail, the inclusion of dependent frame entropy coding allowed point cloud encoder 200 or point cloud decoder 300, for a first slice, in coding order, of a current frame, to determine entropy coding states (e.g., by copying entropy coding states) from a last slice, in coding order, of a previous frame.

The following describes dependent frame entropy coding. Dependent frame entropy coding may be used to copy entropy coding states from slices of another frame. This may be unlike entropy continuation that copies contexts from other slices in the same frame (e.g., a frame A is coded, and frame B is coded as inter predicted frame with the frame A being the reference frame of frame B). When dependent frame entropy coding is enabled, the entropy coding state of a slice in frame B is copied from a slice of frame A.

In G-PCC, a flag (gof_geom_entropy_continuation) is signaled in the GPS that indicates that dependent-frame entropy coding is enabled. The gof_gcom_entropy_continuation flag may be considered as a high-level flag that is applicable to one or more frames. For instance, if gof_geom_entropy_continuation flag is enabled, it is allowable for the entropy coding states of a slice of a current frame to be determined based on the entropy coding state of a slice of a previous frame.

Figure 9:
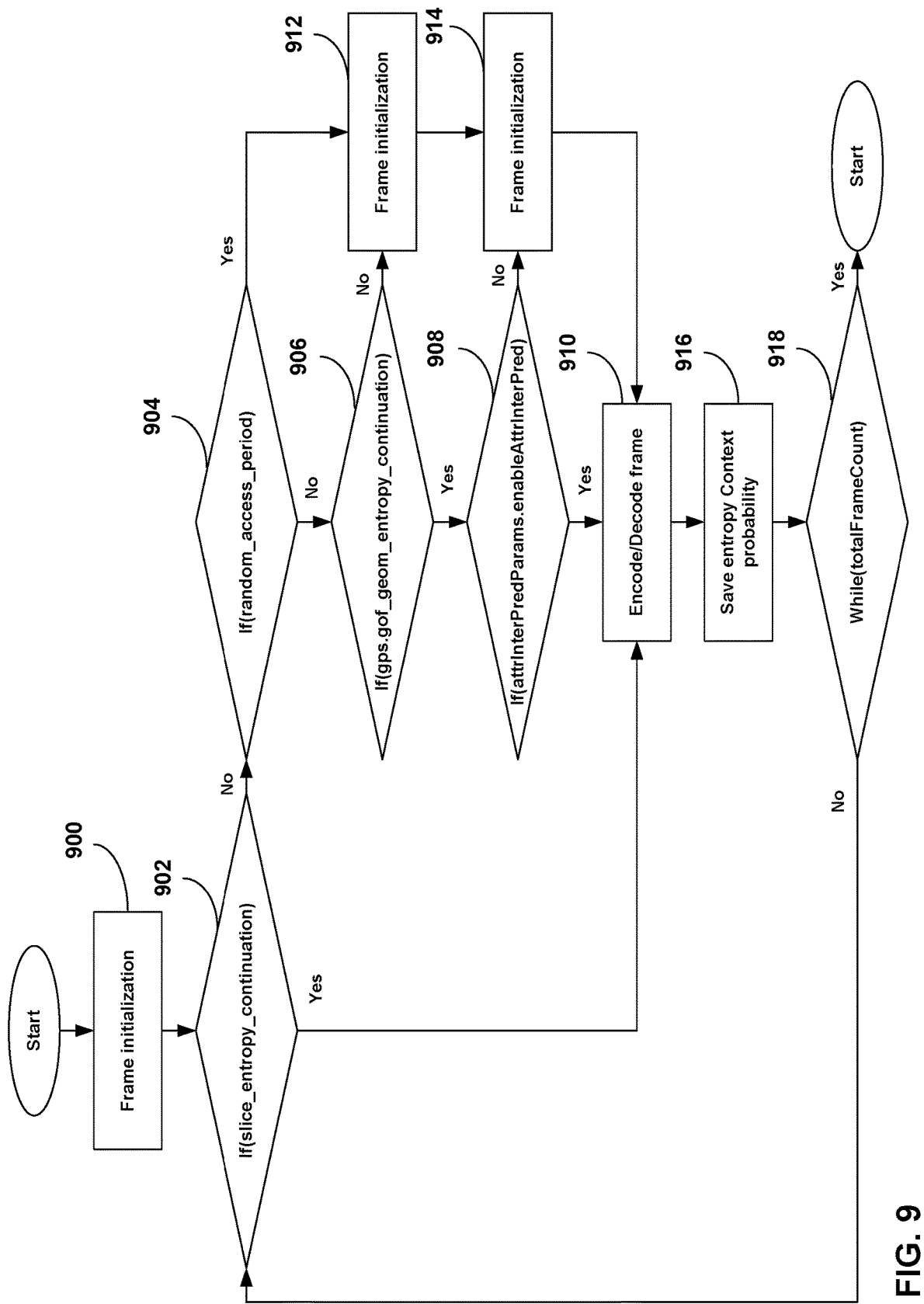
FIG. 9 is a flowchart illustrating an example of dependent frame entropy coding.

When dependent frame entropy coding is enabled, and attribute inter prediction is enabled, entropy coding states are also copied for attributes. This process is illustrated in FIG. 9. For example, in FIG. 9, the process starts with frame initialization (900). Point cloud decoder 300 may determine whether for a particular slice entropy continuation is enabled (902). If enabled (YES of 902), point cloud decoder 300 may decode the frame (910). If not enabled (NO of 902), point cloud decoder 300 may determine if random access period is reached (904). If random access period is reached (YES of 904), then point cloud decoder 300 may perform frame initialization 912 and frame initialization 914, followed by decoding the frame (910).

If random access period is not reached (NO of 904), point cloud decoder 300 may determine whether dependent frame entropy coding is enabled or not (906). If dependent frame entropy coding not enabled (NO of 906), point cloud decoder 300 may proceed along the frame initialization 912, 914, and decoding frame 910. If dependent frame entropy coding is enabled (YES of 906), point cloud decoder 300 may determine if attribute prediction parameters are enabled (908), if enabled, perform decoding frame (910), and if not enabled, proceed with frame initialization 914 and decoding frame 910.

After decoding the frame 916, point cloud decoder 300 may save the entropy context probability (916). The entropy context probability is one example of the entropy coding states. Point cloud decoder 300 may repeat these example techniques for each frame in a group (918).

The entropy continuation (e.g., determining entropy coding states of a slice based on another slice in same frame) and dependent frame entropy coding (e.g., determining entropy coding states of a slice in current frame based on a slice in another frame) methods described above may have several shortcomings that are described below. In one or more examples, the techniques described in this disclosure may address some of the shortcomings, but the example techniques should not be considered so limited.

In a first aspect, currently, dependent frame entropy coding is not implemented at the frame level, but rather at the slice level. As a result, the dependent frame entropy coding has the following behavior:

a. When entropy continuation is enabled:
   i. when slice_entropy_continuation is signaled to 1 for a slice (dependent frame entropy coding does not apply)
      1. Case 1: entropy coding states are copied from the previous slice.
   ii. when slice_entropy_continuation is signaled to 0 for a slice:
      1. Case 2a: if dependent frame entropy coding is enabled, entropy coding states are copied from previous slice (for the first slice in a frame, the entropy states are copied from the last slice of the previous frame).
      2. Case 2b: if dependent frame entropy coding is not enabled, entropy coding states are reset.
b. When entropy continuation is disabled:
   i. Case 3a: if dependent frame entropy coding is enabled, entropy coding states are copied from previous slice (for the first slice in a frame, the entropy states are copied from the previous frame).
   ii. Case 3b: if dependent frame entropy coding is not enabled, entropy coding states are reset.

Under cases 1, 2b and 3b, the behavior of the coder (e.g., point cloud encoder 200 or point cloud decoder 300) are clear and well defined. However, in Case 3a, entropy coding states are determined (e.g., copied) from previous slice even when the current slice and the previous slice are part of the current frame. This may not be the intended use case of dependent frame entropy coding. In Case 2a, even though slice_entropy_continuation is 0 (meaning that entropy state is not to be copied), dependent frame entropy (as implemented) would copy the entropy coding states from the previous slice. In this case, the behavior may be contradictory. Effectively, dependent frame entropy coding not just copies the slice of another frame, it also applies to copying the entropy coding states within slices of the frame when slice entropy continuation is not applied.

Dependent frame entropy coding should apply to the first slice in the frame (where it copies the entropy state from the previous/reference frame). Slice entropy continuation does not apply to the first slice of a frame and applies to all the subsequent slices in the frame. Thus, there is a clear distinction in where entropy continuation applies and where dependence frame coding applies. In accordance with one or more examples, the application of dependent frame entropy coding may be decoupled from slice entropy continuation, dependent frame entropy coding may only be applied for the first slice of the frame.

The following may address issues of the first aspect. A first flag may be signaled in the slice to indicate whether entropy coding state for a slice is copied from the entropy coding state of a slice in the previous frame. The first flag may only be signaled when there is an indication (e.g., another flag in a parameter set) that dependent frame entropy coding is enabled. A constraint may be added that the first flag is set equal to 0 for slices that are not the first slice in the frame. For example, only for the first slice, the entropy coding state is copied from a previous frame.

Conditions may be added so that entropy continuation is enabled when dependent frame is enabled. The following constraint(s) may be added:
 a. It is a requirement of bitstream conformance that when dependent frame entropy coding is enabled, entropy_continuation shall be equal to 1.
 b. It is a requirement of bitstream conformance that when dependent frame entropy coding is enabled, slice_entropy_continuation shall be equal to 1 for a slice when the slice is not the first slice of the frame.

Figure 15:
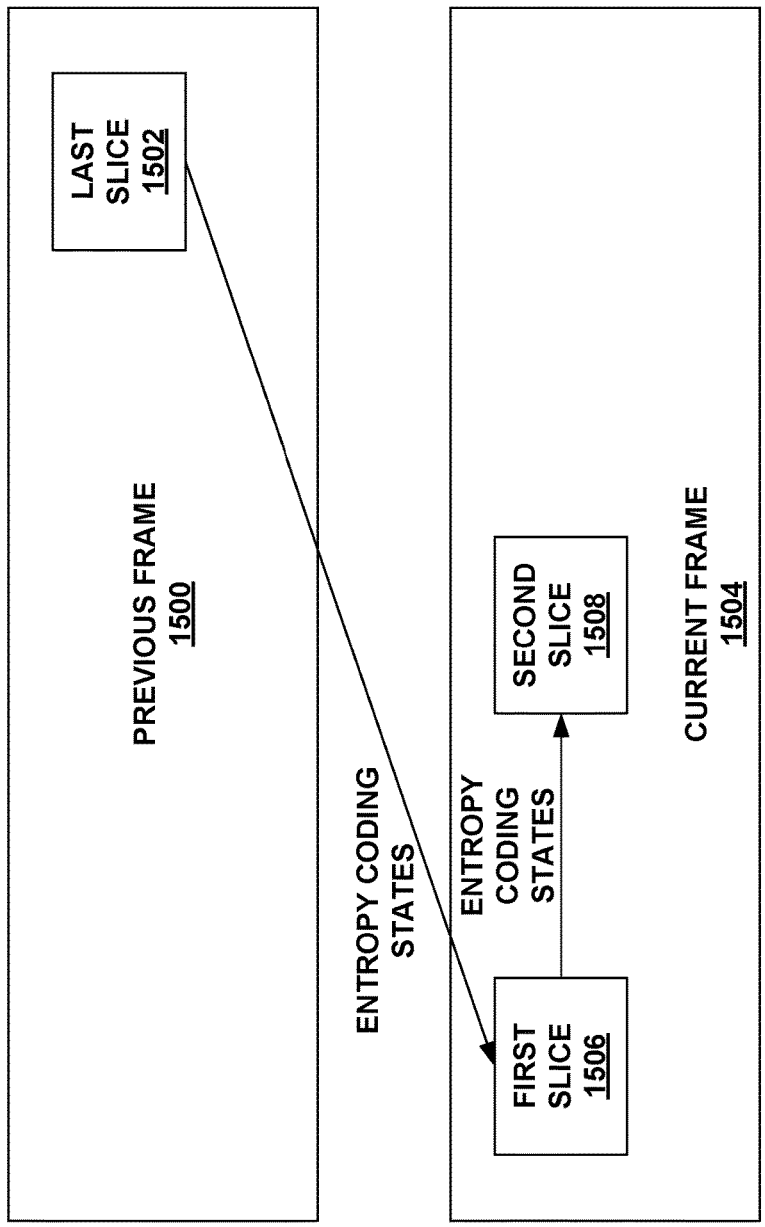
FIG. 15 is a conceptual diagram illustrating an example of frames having dependent frame entropy coding enabled.

FIG. 15 is a conceptual diagram illustrating an example of frames having dependent frame entropy coding enabled. FIG. 15 illustrates the example techniques described above that may address one or more of the issues described above, as non-limiting examples. The following tables illustrate the various conditions for when entropy continuation (e.g., determining entropy coding states of a slice based on another slice in same frame) and dependent frame entropy coding (e.g., determining entropy coding states of a slice in current frame based on a slice in another frame) are enabled or disabled, along with slice level signaling for entropy continuation and dependent frame entropy coding.

As illustrated in FIG. 15, previous frame 1500 includes last slice 1502. Last slice 1502 may be the last slice in coding order of the slices of previous frame 1500, and previous frame 1500 may include more than last slice 1502. Current frame 1504 includes first slice 1506 and second slice 1508. First slice 1506 may the first slice, in coding order, of current frame 1504. Second slice 1508 may be the second slice, in coding order, of current frame 1504.

The following tables illustrate examples for the flags associated with first slice 1506 and second slice 1508.

TABLE 1

| SLICE NUMBER | DEPENDENT FRAME ENTROPY CODING | ENTROPY CONTIN- UATION | SLICE DEP ENTR CONT | SLICE ENTROPY CONTIN- UATION |
|---|---|---|---|---|
| First slice 1506 | True | True | True/False | False |
| Second slice 1508 | True | True | False | True/False |

In table 1, the high-level dependent frame entropy coding flag (e.g., gof_geom_entropy_continuation flag) indicates that dependent frame entropy coding is enabled. That is, it is possible for point cloud encoder 200 and point cloud decoder 300 to determine entropy coding states for first slice 1506 based on the entropy coding states of last slice 1502. The high-level entropy continuation flag indicates that entropy continuation is enabled. That is, it is possible for point cloud encoder 200 and point cloud decoder 300 to determine entropy coding states for second slice 1508 based on the entropy coding states of first slice 1506.

In table 1, for first slice 1506, the slice_dep_entr_cont flag may be true or false. That is, slice_dep_entr_cont flag for first slice 1506 may indicate whether point cloud encoder 200 and point cloud decoder 300 are to determine entropy coding states based on entropy coding states of last slice 1502. In a condition where slice_dep_entr_cont flag is true, point cloud encoder 200 and point cloud decoder 300 may determine the entropy coding states of first slice 1506 based on the entropy coding states of last slice 1502, as illustrated. In a condition where slice_dep_entr_cont flag is false, point cloud encoder 200 and point cloud decoder 300 may set the entropy coding states of first slice 1506 to default values (e.g., reset the entropy coding states).

In table 1, for first slice 1506, slice_entropy_continuation flag is set to false (e.g., by signaling or inferring). This may be because first slice 1506 is the first slice in current frame 1504, and there is no earlier slice in current frame 1504 whose entropy coding states can be used to determine the entropy coding states of first slice 1506.

In table 1, for second slice 1508, the slice_dep_entr_cont flag is set to false (e.g., by signaling or inferring). This may be because second slice 1508 is not the first slice, in coding order, of current frame 1504.

In table 1, for second slice 1508, slice_entropy_continuation flag may be true or false. That is, slice_entropy_continuation flag for second slice 1508 may indicate whether point cloud encoder 200 and point cloud decoder 300 are to determine entropy coding states for second slice 1508 based on entropy coding states of first slice 1504. In a condition where slice_entropy_continuation flag is true, point cloud encoder 200 and point cloud decoder 300 may determine the entropy coding states of second slice 1508 based on the entropy coding states of first slice 1506, as illustrated. In a condition where slice_entropy_continuation flag is false, point cloud encoder 200 and point cloud decoder 300 may set the entropy coding states of second slice 1508 to default values (e.g., reset the entropy coding states).

TABLE 2

| SLICE NUMBER | DEPENDENT FRAME ENTROPY CODING | ENTROPY CONTIN- UATION | SLICE DEP ENTR CONT | SLICE ENTROPY CONTIN- UATION |
|---|---|---|---|---|
| First slice 1506 | True | False | True/False | N/A |
| Second slice 1508 | True | False | False | N/A |

In table 2, the high-level dependent frame entropy coding flag (e.g., gof_geom_entropy_continuation flag) indicates that dependent frame entropy coding is enabled. That is, it is possible for point cloud encoder 200 and point cloud decoder 300 to determine entropy coding states for first slice 1506 based on the entropy coding states of last slice 1502. The high-level entropy continuation flag indicates that entropy continuation is not enabled (e.g., disabled). That is, it is not possible for point cloud encoder 200 and point cloud decoder 300 to determine entropy coding states for second slice 1508 based on the entropy coding states of first slice 1506.

In table 2, for first slice 1506, the slice_dep_entr_cont flag may be true or false. That is, slice_dep_entr_cont flag for first slice 1506 may indicate whether point cloud encoder 200 and point cloud decoder 300 are to determine entropy coding states based on entropy coding states of last slice 1502. In a condition where slice_dep_entr_cont flag is true, point cloud encoder 200 and point cloud decoder 300 may determine the entropy coding states of first slice 1506 based on the entropy coding states of last slice 1502, as illustrated. In a condition where slice_dep_entr_cont flag is false, point cloud encoder 200 and point cloud decoder 300 may set the entropy coding states of first slice 1506 to default values (e.g., reset the entropy coding states).

In table 2, for first slice 1506, slice_entropy_continuation flag may not be signaled or may be inferred to be disabled. This may be because the high-level entropy continuation flag indicates that entropy continuation is disabled for the one or more frames. Therefore, there may not be a need to indicate, at a slice level, whether entropy continuation is enabled or disabled for first slice 1506. Also, because there are no earlier slices in current frame 1504 than first slice 1506, the slice_entropy_continuation flag may not be needed or may be inferred to be false.

In table 2, for second slice 1508, the slice_dep_entr_cont flag is set to false (e.g., by signaling or inferring). This may be because second slice 1508 is not the first slice, in coding order, of current frame 1504. Similar to first slice 1506, for second slice 1508, slice_entropy_continuation flag may not be signaled or may be inferred to be disabled. This may be because the high-level entropy continuation flag indicates that entropy continuation is disabled for the one or more frames. Therefore, there may not be a need to indicate, at a slice level, whether entropy continuation is enabled or disabled for second slice 1508. In this example, point cloud encoder 200 and point cloud decoder 300 may determine the entropy coding states for second slice 1508 based on default values (e.g., reset the entropy coding states for second slice 1508).

be because the high-level dependent frame entropy coding flag indicates that dependent frame entropy coding is disabled for the one or more frames. Therefore, there may not be a need to indicate, at a slice level, whether dependent frame entropy coding is enabled or disabled for first slice 1506. In this example, point cloud encoder 200 and point cloud decoder 300 may determine the entropy coding states for first slice 1506 based on default values (e.g., reset the entropy coding states for first slice 1506).

In table 3, for first slice 1506, slice_entropy_continuation flag is set to false (e.g., by signaling or inferring). This may be because first slice 1506 is the first slice in current frame 1504, and there is no earlier slice in current frame 1504 whose entropy coding states can be used to determine the entropy coding states of first slice 1506.

In table 3, for second slice 1508, the slice_dep_entr_cont flag may not be signaled or may be inferred to be false. This may be because the high-level dependent frame entropy coding flag indicates that dependent frame entropy coding is disabled for the one or more frames. Therefore, there may not be a need to indicate, at a slice level, whether dependent frame entropy coding is enabled or disabled for second slice 1508. Moreover, since second slice 1508 is not the first slice, in coding order, of current frame 1504, dependent frame entropy coding may automatically be disabled.

In table 3, for second slice 1508, slice_entropy_continuation flag may be true or false. That is, slice_entropy_continuation flag for second slice 1508 may indicate whether point cloud encoder 200 and point cloud decoder 300 are to determine entropy coding states for second slice 1508 based on entropy coding states of first slice 1506. In a condition where slice_entropy_continuation flag is true, point cloud encoder 200 and point cloud decoder 300 may determine the entropy coding states of second slice 1508 based on the entropy coding states of first slice 1506, as illustrated. In a condition where slice_entropy_continuation flag is false, point cloud encoder 200 and point cloud decoder 300 may set the entropy coding states of second slice 1508 to default values (e.g., reset the entropy coding states).

TABLE 3

| SLICE NUMBER | DEPENDENT FRAME ENTROPY CODING | ENTROPY CONTINUATION | SLICE DEP ENTR CONT | SLICE ENTROPY CONTINUATION |
|---|---|---|---|---|
| First slice 1506 | False | True | N/A | False |
| Second slice 1508 | False | True | N/A | True/False |

In table 3, the high-level dependent frame entropy coding flag (e.g., gof_geom_entropy_continuation flag) indicates that dependent frame entropy coding is not enabled (e.g., disabled). That is, it is not possible for point cloud encoder 200 and point cloud decoder 300 to determine entropy coding states for first slice 1506 based on the entropy coding states of last slice 1502. The high-level entropy continuation flag indicates that entropy continuation is enabled. That is, it is possible for point cloud encoder 200 and point cloud decoder 300 to determine entropy coding states for second slice 1508 based on the entropy coding states of first slice 1506.

In table 3, for first slice 1506, the slice_dep_entr_cont flag may not be signaled or may be inferred to be false. This may

TABLE 4

| SLICE NUMBER | DEPENDENT FRAME ENTROPY CODING | ENTROPY CONTINUATION | SLICE DEP ENTR CONT | SLICE ENTROPY CONTINUATION |
|---|---|---|---|---|
| First slice 1506 | False | False | N/A | N/A |
| Second slice 1508 | False | False | N/A | N/A |

In table 4, the high-level dependent frame entropy coding flag (e.g., gof_geom_entropy_continuation flag) indicates that dependent frame entropy coding is not enabled (e.g., disabled). That is, it is not possible for point cloud encoder 200 and point cloud decoder 300 to determine entropy coding states for first slice 1506 based on the entropy coding states of last slice 1502. The high-level entropy continuation flag indicates that entropy continuation is not enabled (e.g., disabled). That is, it is not possible for point cloud encoder 200 and point cloud decoder 300 to determine entropy coding states for second slice 1508 based on the entropy coding states of first slice 1506.

In table 4, for first slice 1506, the slice_dep_entr_cont flag may not be signaled or may be inferred to be false. This may be because the high-level dependent frame entropy coding flag indicates that dependent frame entropy coding is disabled for the one or more frames. Therefore, there may not be a need to indicate, at a slice level, whether dependent frame entropy coding is enabled or disabled for first slice 1506. In this example, point cloud encoder 200 and point cloud decoder 300 may determine the entropy coding states for first slice 1506 based on default values (e.g., reset the entropy coding states for first slice 1506).

In table 4, for first slice 1506, the slice_entropy_continuation flag may not be signaled or may be inferred to be false. This may be because the high-level entropy continuation flag indicates that entropy continuation is disabled for the one or more frames. Therefore, there may not be a need to indicate, at a slice level, whether entropy continuation is enabled or disabled for first slice 1506. Also, because there are no earlier slices in current frame 1504 than first slice 1506, the slice_entropy_continuation flag may not be needed or may be inferred to be false.

In table 4, for second slice 1508, the slice_dep_entr_cont flag may not be signaled or may be inferred to be false. This may be because the high-level dependent frame entropy coding flag indicates that dependent frame entropy coding is disabled for the one or more frames. Moreover, second slice 1508 is not the first slice in coding order for current frame 1504.

In table 4, for second slice 1508, the slice_entropy_continuation flag may not be signaled or may be inferred to be false. This may be because the high-level entropy continuation flag indicates that entropy continuation is disabled for the one or more frames. Therefore, there may not be a need to indicate, at a slice level, whether entropy continuation is enabled or disabled for second slice 1508. In this example, point cloud encoder 200 and point cloud decoder 300 may determine the entropy coding states for second slice 1508 based on default values (e.g., reset the entropy coding states for second slice 1508).

In a second aspect, checking the attribute inter prediction flag for dependent frame entropy coding is supposedly to address the case where inter prediction is applied for geometry, but inter prediction is not applied for attributes. Although this case may be rare, even in such cases, entropy coding for the geometry already introduces a frame dependency that cannot be decoupled/escaped by attributes. Thus, it is highly unlikely that a system may be able to take advantage of such a use case. It is more likely the case that when entropy coding states for a frame are copied for geometry, this would also apply for attributes. It may be observed that slice entropy continuation (in Edition 1) is not defined separately for geometry and attributes. Slice entropy continuation may be defined together with geometry and attributes (e.g., they are applied to both together).

The following may address issues of the second aspect. When dependent frame entropy coding is applied to a slice, the entropy coding states of both the geometry and attributes of a slice are copied from the respective geometry and attributes of another slice in a previous frame. For example, point cloud encoder 200 and point cloud decoder 300 may determine entropy coding states of geometry data of the first slice 1506 of the current frame 1504 based on entropy coding states of geometry data of the last slice 1502 of the previous frame 1500, and determine entropy coding states of attribute data of the first slice 1506 of the current frame 1504 based on entropy coding states of attribute data of the last slice 1502 of the previous frame 1500. As another example, point cloud encoder 200 and point cloud decoder 300 may determine entropy coding states of geometry data of the second slice 1508 of the current frame 1504 based on entropy coding states of geometry data of the first slice 1506 of the current frame 1504, and determine entropy coding states of attribute data of the second slice 1508 of the current frame 1504 based on entropy coding states of attribute data of the first slice 1506 of the current frame 1504.

In a third aspect, a prev_slice_id is signaled for slice entropy continuation to detect the loss of a slice. Without the presence of this information, point cloud decoder 300 may not be able to determine whether the parsing of a slice would be successful. If the previous frame on which the current frame entropy coding was dependent was lost, the current decoder would most likely try to parse the information until a crash/failure occurs. However, similar information is not applied signaled for dependent frame entropy coding.

The following may address issues of the third aspect. When dependent frame entropy coding is enabled, an indicator/reference is signaled for each dependent frame which points out the frame on which the entropy state is dependent. For example, suppose that Frame A is coded, and the entropy coding state of a slice in Frame B is dependent on a slice in Frame A, then an indicator of frame ID of Frame A is signaled. In some examples, the ID of the slice in Frame A from the entropy states are copied to Frame B is also signaled. For example, in a condition where point cloud encoder 200 and point cloud decoder 300 determine entropy coding states for first slice 1506 of current frame 1504 based on the entropy coding states of last slice 1502 of previous frame 1500, point cloud encoder 200 may signal and point cloud decoder 300 may parse frame identification information for the previous frame 1500, and in some cases, identification information of the previous slice 1502 of the previous frame 1500.

As examples of techniques described in this disclosure, when dependent frame entropy coding is enabled, a prev_frame_id is signaled to indicate a previous frame 1500 from which the entropy state is to be copied. In some examples, a prev_slice_id is also signaled to indicate the last slice 1502 in the previous frame 1500 from which the entropy state is to be copied.

In some examples, only a few bits of the previous frame ID (e.g., one or more LSB bits) is signaled. The coder then derives the previous frame ID from the few bits of the previous frame ID (e.g., derivation could be similar to how the frame counter is derived). In some examples, a delta value indicating a difference between the frame ID of the current frame and the previous frame.

In some examples, the following applies:
a. when slice_entropy_continuation is 0 and dependent frame entropy coding is to be applied a slice in the frame, then a prev_slice_id and prev_frame_id are signaled to indicate the slice ID and frame ID of the slice from which the entropy states are to be copied.

Figure 16:
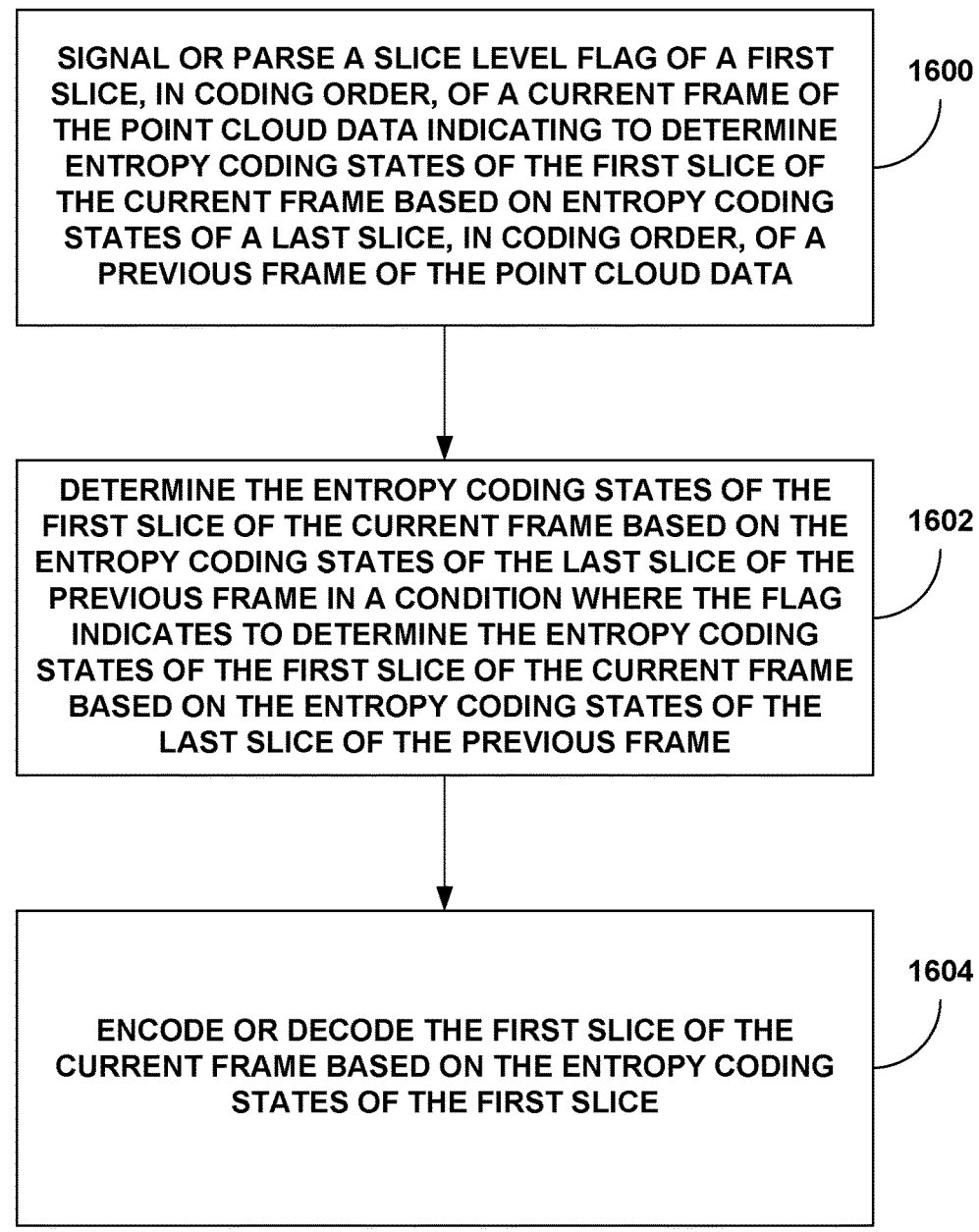
FIG. 16 is a flowchart illustrating example techniques in accordance with one or more examples described in this disclosure.

FIG. 16 is a flowchart illustrating example techniques in accordance with one or more examples described in this disclosure. For instance, FIG. 16 illustrate example techniques of encoding or decoding point cloud data. For ease of illustration, FIG. 15 is used to describe the techniques of FIG. 16. For example, one or more memories may be configured to store point cloud data. Examples of the one or more memories include memory 106, memory 120, memory dedicated to point cloud encoder 200, memory dedicated to point cloud decoder 300, or some other memory. Processing circuitry may be coupled to the one or more memories, and may be configured to perform the example techniques described in the disclosure. Examples of the processing circuitry include fixed-function and/or programmable circuitry of point cloud encoder 200 or point cloud decoder 300.

The processing circuitry of point cloud encoder 200 may signal and the processing circuitry of point cloud decoder 300 may parse a slice level flag of a first slice 1506, in coding order, of a current frame 1504 of the point cloud data indicating to determine entropy coding states of the first slice 1506 of the current frame 1504 based on entropy coding states of a last slice 1502, in coding order, of a previous frame 1500 of the point cloud data (1600). For example, the processing circuitry of point cloud encoder 200 may signal and the processing circuitry of point cloud decoder 300 may parse the slice_dep_entr_cont flag of first slice 1506 that indicates determining determine entropy coding states of the first slice 1506 of the current frame 1504 based on entropy coding states of a last slice 1502, in coding order, of a previous frame 1500 of the point cloud data.

Moreover, in some examples, the processing circuitry of point cloud encoder 200 may signal and the processing circuitry of point cloud decoder 300 may parse frame identification information for the previous frame 1500. For example, point cloud encoder 200 may signal and point cloud decoder 300 may parse a prev_frame_id or information that is used to determine prev_frame_id, where prev_frame_id is the identification of previous frame 1500.

In some examples, the processing circuitry of point cloud encoder 200 or point cloud decoder 300 may determine that dependent frame entropy coding is enabled for one or more frames. For instance, point cloud encoder 200 may signal and point cloud decoder 300 may parse the high-level dependent frame entropy coding flag (e.g., gof_geom_entropy_continuation flag). The high-level dependent frame entropy coding flag may be considered as a second flag that is signaled or parsed from a parameter set of the one or more frames (e.g., GPS) that indicates that dependent frame entropy coding is enabled for the one or more frames.

In one or more examples, point cloud encoder 200 or point cloud decoder 300 may signal or parse the flag (e.g., the slice_dep_entr_cont flag) in a condition where dependent frame entropy coding is enabled for one or more frames. Stated another way, in a condition where the high-level dependent frame entropy coding flag is true, then point cloud encoder 200 may signal and point cloud decoder 300 may parse the slice_dep_entr_cont flag. In a condition where the high-level dependent frame entropy coding flag is false, then point cloud encoder 200 may not signal and point cloud decoder 300 may not parse the slice_dep_entr_cont flag.

The processing circuitry of point cloud encoder 200 or point cloud decoder 300 may determine the entropy coding states of the first slice 1506 of the current frame 1504 based on the entropy coding states of the last slice 1502 of the previous frame 1500 in a condition where the flag (e.g., slice_dep_entr_cont flag) indicates to determine the entropy coding states of the first slice 1506 of the current frame 1504 based on the entropy coding states of the last slice 1502 of the previous frame 1500 (1602). For example, to determine the entropy coding states, the processing circuitry of point cloud encoder 200 or point cloud decoder 300 may copy the entropy coding states of the last slice 1502 of the previous frame 1500 as the entropy coding states of the first slice 1506 of the current frame 1504. In some examples, there may be some further modifications of the entropy coding states of the last slice 1502 as part of determining the entropy coding states of first slice 1506. However, such modifications may not be necessary, and the entropy coding states of first slice 1506 may be a copy of the entropy coding states of last slice 1502.

In some examples, the flag (e.g., slice_dep_entr_cont flag) is a first flag. The processing circuitry of point cloud encoder 200 may signal and the processing circuitry of point cloud decoder 300 may parse a second slice level flag (e.g., slice_entropy_continuation) of a second slice 1508, in coding order, of the current frame 1504 indicating to determine entropy coding states of the second slice 1508 of the current frame 1504 based on the entropy coding states of the first slice 1506 of the current frame 1504.

In one or more examples, to determine the entropy coding states of the first slice 1506 of the current frame 1504 based on the entropy coding states of the last slice 1502 of the previous frame 1500, the processing circuitry of point cloud encoder 200 or point cloud decoder 300 may determine entropy coding states of geometry data of the first slice 1506 of the current frame 1504 based on entropy coding states of geometry data of the last slice 1502 of the previous frame 1500, and determine entropy coding states of attribute data of the first slice 1506 of the current frame 1504 based on entropy coding states of attribute data of the last slice 1502 of the previous frame 1500. In one or more examples, to determine the entropy coding states of the second slice 1508 of the current frame 1504 based on the entropy coding states of the first slice 1506 of the current frame 1504, the processing circuitry of point cloud encoder 200 or point cloud decoder 300 may determine entropy coding states of geometry data of the second slice 1508 of the current frame 1504 based on entropy coding states of geometry data of the first slice 1506 of the current frame 1504, and determine entropy coding states of attribute data of the second slice 1508 of the current frame 1504 based on entropy coding states of attribute data of the first slice 1506 of the current frame 1504.

The processing circuitry of point cloud encoder 200 may encode and the processing circuitry of point cloud decoder 300 may decode the first slice 1506 of the current frame 1504 based on the entropy coding states of the first slice 1506 (1604). For example, the processing circuitry of point cloud decoder 300 may parse, from a bitstream, information for the first slice 1506, and entropy decode the information for the first slice 1506 based on the entropy coding states of the first slice 1506 (e.g., as part of reconstructing the point cloud). The processing circuitry of point cloud encoder 200 may entropy encode information for the first slice 1506 based on the entropy coding states of the first slice 1506, and signal, in a bitstream, the entropy encoded information for the first slice 1506 (e.g., as part of encoding the point cloud).

Figure 10:
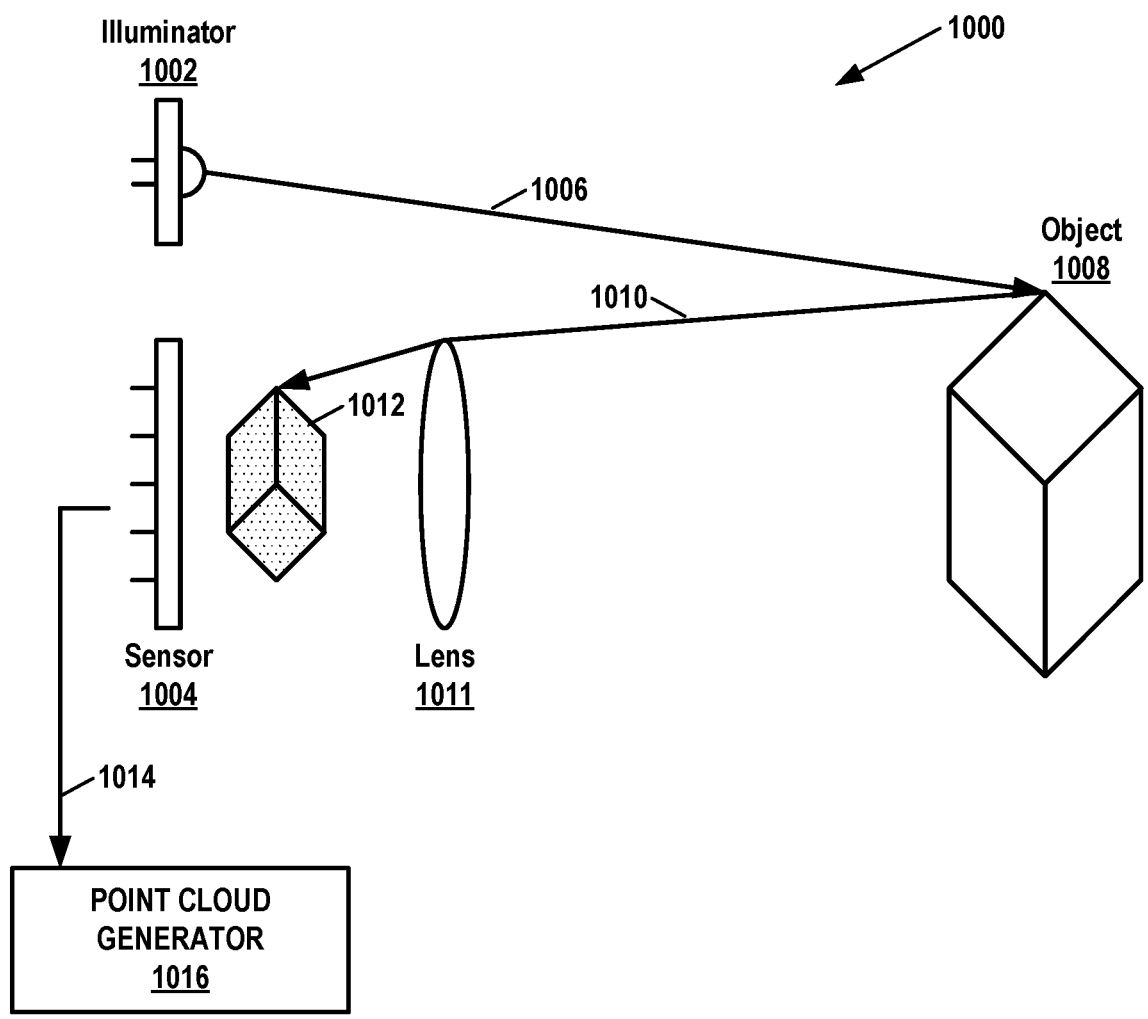
FIG. 10 is a conceptual diagram illustrating an example range-finding system that may be used with one or more techniques of this disclosure.

FIG. 10 is a conceptual diagram illustrating an example range-finding system 1000 that may be used with one or more techniques of this disclosure. In the example of FIG. 10, range-finding system 1000 includes an illuminator 1002 and a sensor 1004. Illuminator 1002 may emit light 1006. In some examples, illuminator 1002 may emit light 1006 as one or more laser beams. Light 1006 may be in one or more wavelengths, such as an infrared wavelength or a visible light wavelength. In other examples, light 1006 is not coherent, laser light. When light 1006 encounters an object, such as object 1008, light 1006 creates returning light 1010. Returning light 1010 may include backscattered and/or reflected light. Returning light 1010 may pass through a lens 1011 that directs returning light 1010 to create an image 1012 of object 1008 on sensor 1004. Sensor 1004 generates signals 1014 based on image 1012. Image 1012 may comprise a set of points (e.g., as represented by dots in image 1012 of FIG. 10).

In some examples, illuminator 1002 and sensor 1004 may be mounted on a spinning structure so that illuminator 1002 and sensor 1004 capture a 360-degree view of an environment (e.g., a spinning LIDAR sensor). In other examples, range-finding system 1000 may include one or more optical components (e.g., mirrors, collimators, diffraction gratings, etc.) that enable illuminator 1002 and sensor 1004 to detect ranges of objects within a specific range (e.g., up to 360-degrees). Although the example of FIG. 10 only shows a single illuminator 1002 and sensor 1004, range-finding system 1000 may include multiple sets of illuminators and sensors.

In some examples, illuminator 1002 generates a structured light pattern. In such examples, range-finding system 1000 may include multiple sensors 1004 upon which respective images of the structured light pattern are formed. Range-finding system 1000 may use disparities between the images of the structured light pattern to determine a distance to an object 1008 from which the structured light pattern backscatters. Structured light-based range-finding systems may have a high level of accuracy (e.g., accuracy in the sub-millimeter range), when object 1008 is relatively close to sensor 1004 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1000 is a time of flight (ToF)-based system. In some examples where range-finding system 1000 is a ToF-based system, illuminator 1002 generates pulses of light. In other words, illuminator 1002 may modulate the amplitude of emitted light 1006. In such examples, sensor 1004 detects returning light 1010 from the pulses of light 1006 generated by illuminator 1002. Range-finding system 1000 may then determine a distance to object 1008 from which light 1006 backscatters based on a delay between when light 1006 was emitted and detected and the known speed of light in air). In some examples, rather than (or in addition to) modulating the amplitude of the emitted light 1006, illuminator 1002 may modulate the phase of the emitted light 1006. In such examples, sensor 1004 may detect the phase of returning light 1010 from object 1008 and determine distances to points on object 1008 using the speed of light and based on time differences between when illuminator 1002 generated light 1006 at a specific phase and when sensor 1004 detected returning light 1010 at the specific phase.

In other examples, a point cloud may be generated without using illuminator 1002. For instance, in some examples, sensors 1004 of range-finding system 1000 may include two or more optical cameras. In such examples, range-finding system 1000 may use the optical cameras to capture stereo images of the environment, including object 1008. Range-finding system 1000 may include a point cloud generator 1016 that may calculate the disparities between locations in the stereo images. Range-finding system 1000 may then use the disparities to determine distances to the locations shown in the stereo images. From these distances, point cloud generator 1016 may generate a point cloud.

Sensors 1004 may also detect other attributes of object 1008, such as color and reflectance information. In the example of FIG. 10, a point cloud generator 1016 may generate a point cloud based on signals 1014 generated by sensor 1004. Range-finding system 1000 and/or point cloud generator 1016 may form part of data source 104 (FIG. 1). Hence, a point cloud generated by range-finding system 1000 may be encoded and/or decoded according to any of the techniques of this disclosure.

Figure 11:
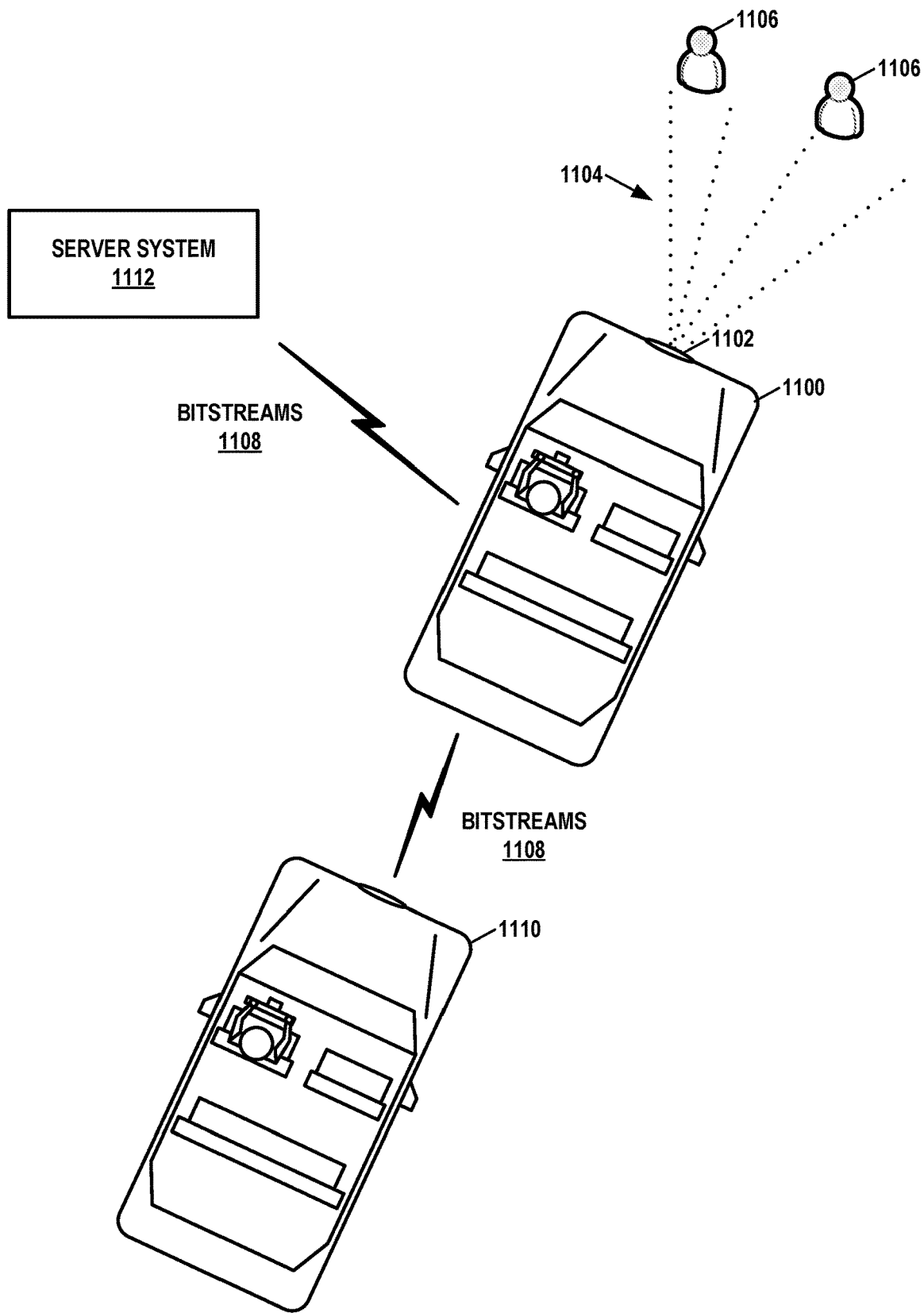
FIG. 11 is a conceptual diagram illustrating an example vehicle-based scenario in which one or more techniques of this disclosure may be used.

FIG. 11 is a conceptual diagram illustrating an example vehicle-based scenario in which one or more techniques of this disclosure may be used. In the example of FIG. 11, a vehicle 1100 includes a range-finding system 1102. Range-finding system 1102 may be implemented in the manner discussed with respect to FIG. 11. Although not shown in the example of FIG. 11, vehicle 1100 may also include a data source, such as data source 104 (FIG. 1), and a G-PCC encoder, such as point cloud encoder 200 (FIG. 1). In the example of FIG. 11, range-finding system 1102 emits laser beams 1104 that reflect off pedestrians 1106 or other objects in a roadway. The data source of vehicle 1100 may generate a point cloud based on signals generated by range-finding system 1102. The G-PCC encoder of vehicle 1100 may encode the point cloud to generate bitstreams 1108, such as geometry bitstream 203 (FIG. 2) and attribute bitstream 205 (FIG. 2). Inter prediction and residual prediction, as described in this disclosure may reduce the size of the geometry bitstream. Bitstreams 1108 may include many fewer bits than the unencoded point cloud obtained by the G-PCC encoder.

An output interface of vehicle 1100 (e.g., output interface 108 (FIG. 1) may transmit bitstreams 1108 to one or more other devices. Bitstreams 1108 may include many fewer bits than the unencoded point cloud obtained by the G-PCC encoder. Thus, vehicle 1100 may be able to transmit bitstreams 1108 to other devices more quickly than the unencoded point cloud data. Additionally, bitstreams 1108 may require less data storage capacity on a device.

In the example of FIG. 11, vehicle 1100 may transmit bitstreams 1108 to another vehicle 1110. Vehicle 1110 may include a G-PCC decoder, such as point cloud decoder 300 (FIG. 1). The G-PCC decoder of vehicle 1110 may decode bitstreams 1108 to reconstruct the point cloud. Vehicle 1110 may use the reconstructed point cloud for various purposes. For instance, vehicle 1110 may determine based on the reconstructed point cloud that pedestrians 1106 are in the roadway ahead of vehicle 1100 and therefore start slowing down, e.g., even before a driver of vehicle 1110 realizes that pedestrians 1106 are in the roadway. Thus, in some examples, vehicle 1110 may perform an autonomous navigation operation based on the reconstructed point cloud.

Additionally or alternatively, vehicle 1100 may transmit bitstreams 1108 to a server system 1112. Server system 1112 may use bitstreams 1108 for various purposes. For example, server system 1112 may store bitstreams 1108 for subsequent reconstruction of the point clouds. In this example, server system 1112 may use the point clouds along with other data (e.g., vehicle telemetry data generated by vehicle 1100) to train an autonomous driving system. In other example, server system 1112 may store bitstreams 1108 for subsequent reconstruction for forensic crash investigations.

Figure 12:
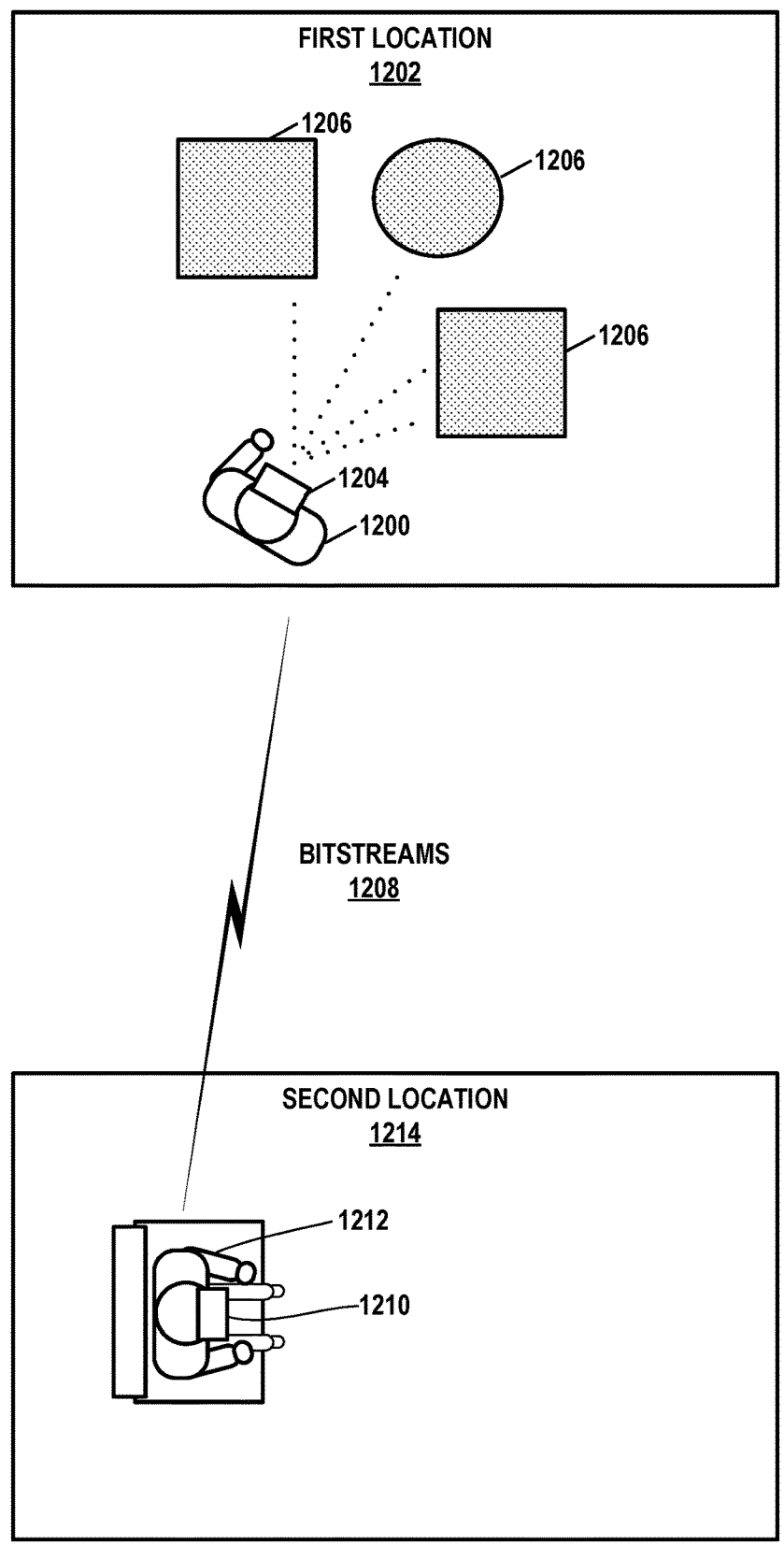
FIG. 12 is a conceptual diagram illustrating an example extended reality system in which one or more techniques of this disclosure may be used.

FIG. 12 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 12, a user 1200 is located in a first location 1202. User 1200 wears an XR headset 1204. As an alternative to XR headset 1204, user 1200 may use a mobile device (e.g., mobile phone, tablet computer, etc.). XR headset 1204 includes a depth detection sensor, such as a range-finding system, that detects positions of points on objects 1206 at location 1202. A data source of XR headset 1204 may use the signals generated by the depth detection sensor to generate a point cloud representation of objects 1206 at location 1202. XR headset 1204 may include a G-PCC encoder (e.g., point cloud encoder 200 of FIG. 1) that is configured to encode the point cloud to generate bitstreams 1208. Inter prediction and residual prediction, as described in this disclosure may reduce the size of bitstream 1208.

XR headset 1204 may transmit bitstreams 1208 (e.g., via a network such as the Internet) to an XR headset 1210 worn by a user 1212 at a second location 1214. XR headset 1210 may decode bitstreams 1208 to reconstruct the point cloud. XR headset 1210 may use the point cloud to generate an XR visualization (e.g., an AR, MR, VR visualization) representing objects 1206 at location 1202. Thus, in some examples, such as when XR headset 1210 generates an VR visualization, user 1212 may have a 3D immersive experience of location 1202. In some examples, XR headset 1210 may determine a position of a virtual object based on the reconstructed point cloud. For instance, XR headset 1210 may determine, based on the reconstructed point cloud, that an environment (e.g., location 1202) includes a flat surface and then determine that a virtual object (e.g., a cartoon character) is to be positioned on the flat surface. XR headset 1210 may generate an XR visualization in which the virtual object is at the determined position. For instance, XR headset 1210 may show the cartoon character sitting on the flat surface.

Figure 13:
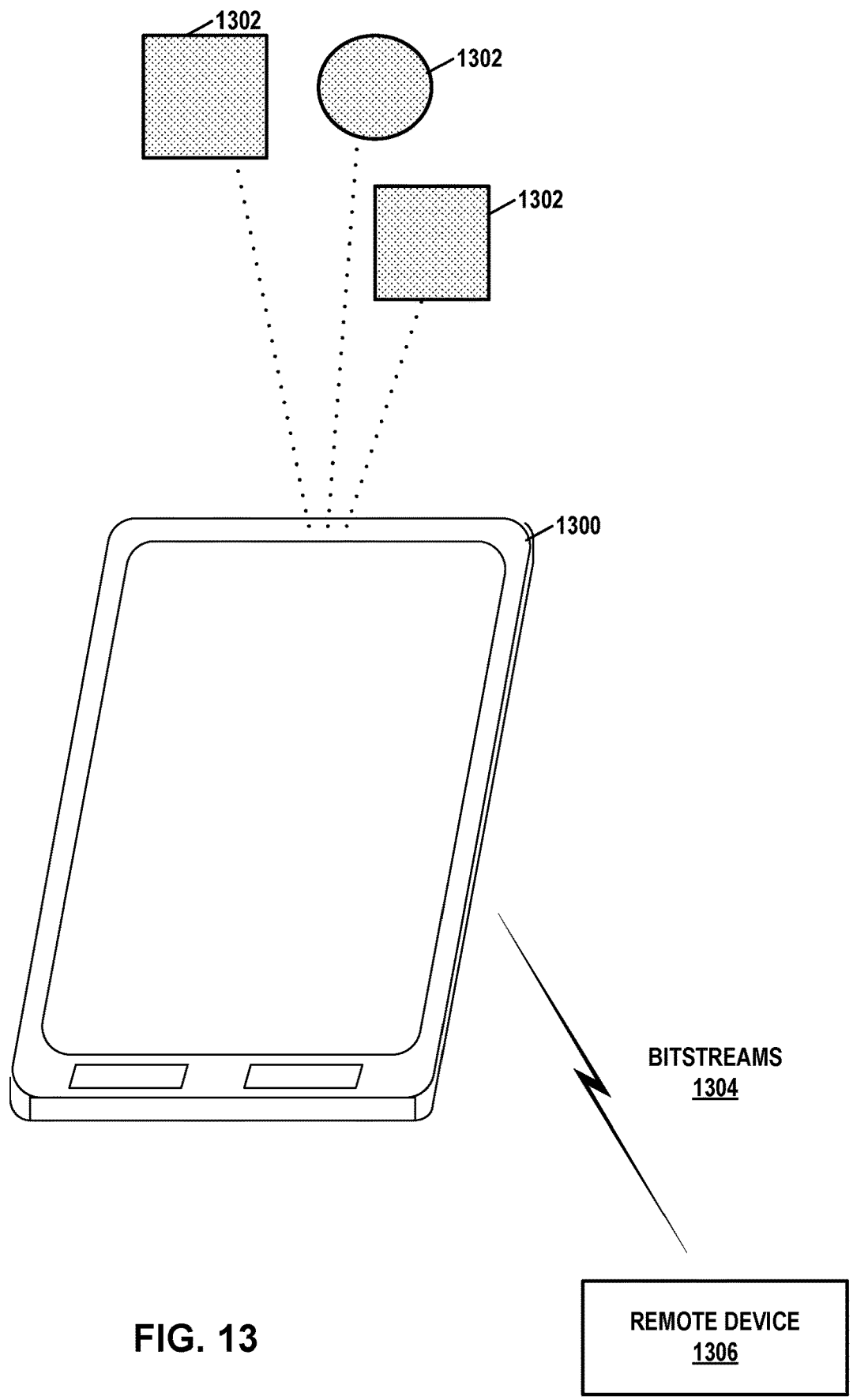
FIG. 13 is a conceptual diagram illustrating an example mobile device system in which one or more techniques of this disclosure may be used.

FIG. 13 is a conceptual diagram illustrating an example mobile device system in which one or more techniques of this disclosure may be used. In the example of FIG. 13, a mobile device 1300 (e.g., a wireless communication device), such as a mobile phone or tablet computer, includes a range-finding system, such as a LIDAR system, that detects positions of points on objects 1302 in an environment of mobile device 1300. A data source of mobile device 1300 may use the signals generated by the depth detection sensor to generate a point cloud representation of objects 1302. Mobile device 1300 may include a G-PCC encoder (e.g., point cloud encoder 200 of FIG. 1) that is configured to encode the point cloud to generate bitstreams 1304. In the example of FIG. 13, mobile device 1300 may transmit bitstreams to a remote device 1306, such as a server system or other mobile device. Inter prediction and residual prediction, as described in this disclosure may reduce the size of bitstreams 1304. Remote device 1306 may decode bitstreams 1304 to reconstruct the point cloud. Remote device 1306 may use the point cloud for various purposes. For example, remote device 1306 may use the point cloud to generate a map of environment of mobile device 1300. For instance, remote device 1306 may generate a map of an interior of a building based on the reconstructed point cloud. In another example, remote device 1306 may generate imagery (e.g., computer graphics) based on the point cloud. For instance, remote device 1306 may use points of the point cloud as vertices of polygons and use color attributes of the points as the basis for shading the polygons. In some examples, remote device 1306 may use the reconstructed point cloud for facial recognition or other security applications.

Examples in the various aspects of this disclosure may be used individually or in any combination.

Clause 1. A method of encoding or decoding point cloud data, the method comprising: signaling or parsing a slice level flag of a first slice, in coding order, of a current frame of the point cloud data indicating to determine entropy coding states of the first slice of the current frame based on entropy coding states of a last slice, in coding order, of a previous frame of the point cloud data; determining the entropy coding states of the first slice of the current frame based on the entropy coding states of the last slice of the previous frame in a condition where the flag indicates to determine the entropy coding states of the first slice of the current frame based on the entropy coding states of the last slice of the previous frame; and encoding or decoding the first slice of the current frame based on the entropy coding states of the first slice.

Clause 2. The method of clause 1, wherein determining the entropy coding states comprises copying the entropy coding states of the last slice of the previous frame as the entropy coding states of the first slice of the current frame.

Clause 3. The method of any of clauses 1 and 2, further comprising: determining that dependent frame entropy coding is enabled for one or more frames, wherein signaling or parsing the flag comprises signaling or parsing the flag in a condition where dependent frame entropy coding is enabled for one or more frames.

Clause 4. The method of clause 3, wherein the flag comprises a first flag, wherein determining that dependent frame entropy coding is enabled comprises parsing, a second flag, from a parameter set of the one or more frames that indicates that dependent frame entropy coding is enabled for the one or more frames.

Clause 5. The method of any of clauses 1-4, wherein the flag is a first flag, the method further comprising: signaling or parsing a second slice level flag of a second slice, in coding order, of the current frame indicating to determine entropy coding states of the second slice of the current frame based on the entropy coding states of the first slice of the current frame.

Clause 6. The method of any of clauses 1-5, wherein determining the entropy coding states of the first slice of the current frame based on the entropy coding states of the last slice of the previous frame comprises: determining entropy coding states of geometry data of the first slice of the current frame based on entropy coding states of geometry data of the last slice of the previous frame; and determining entropy coding states of attribute data of the first slice of the current frame based on entropy coding states of attribute data of the last slice of the previous frame.

Clause 7. The method of any of clauses 1-6, further comprising: signaling or parsing frame identification information for the previous frame.

Clause 8. The method of any of clauses 1-7, further comprising: parsing, from a bitstream, information for the first slice, wherein encoding or decoding the first slice comprises entropy decoding the information for the first slice based on the entropy coding states of the first slice.

Clause 9. The method of any of clauses 1-7, wherein encoding or decoding the first slice comprises entropy encoding information for the first slice based on the entropy coding states of the first slice, the method further comprising: signaling, in a bitstream, the entropy encoded information for the first slice.

Clause 10. A device for encoding or decoding point cloud data, the device comprising: one or more memories configured to store the point cloud data; and processing circuitry coupled to the one or more memories, wherein the processing circuitry is configured to: signal or parse a slice level flag of a first slice, in coding order, of a current frame of the point cloud data indicating to determine entropy coding states of the first slice of the current frame based on entropy coding states of a last slice, in coding order, of a previous frame of the point cloud data; determine the entropy coding states of the first slice of the current frame based on the entropy coding states of the last slice of the previous frame in a condition where the flag indicates to determine the entropy coding states of the first slice of the current frame based on the entropy coding states of the last slice of the previous frame; and encode or decode the first slice of the current frame based on the entropy coding states of the first slice.

Clause 11. The device of clause 10, wherein to determine the entropy coding states, the processing circuitry is configured to copy the entropy coding states of the last slice of the previous frame as the entropy coding states of the first slice of the current frame.

Clause 12. The device of any of clauses 10 and 11, wherein the processing circuitry is configured to: determine that dependent frame entropy coding is enabled for one or more frames, wherein to signal or parse the flag, the processing circuitry is configured to signal or parse the flag in a condition where dependent frame entropy coding is enabled for one or more frames.

Clause 13. The device of clause 12, wherein the flag comprises a first flag, wherein to determine that dependent frame entropy coding is enabled, the processing circuitry is configured to parse, a second flag, from a parameter set of the one or more frames that indicates that dependent frame entropy coding is enabled for the one or more frames.

Clause 14. The device of any of clauses 10-13, wherein the flag is a first flag, and wherein the processing circuitry is configured to: signal or parse a second slice level flag of a second slice, in coding order, of the current frame indicating to determine entropy coding states of the second slice of the current frame based on the entropy coding states of the first slice of the current frame.

Clause 15. The device of any of clauses 10-14, wherein to determine the entropy coding states of the first slice of the current frame based on the entropy coding states of the last slice of the previous frame, the processing circuitry is configured to: determine entropy coding states of geometry data of the first slice of the current frame based on entropy coding states of geometry data of the last slice of the previous frame; and determine entropy coding states of attribute data of the first slice of the current frame based on entropy coding states of attribute data of the last slice of the previous frame.

Clause 16. The device of any of clauses 10-15, wherein the processing circuitry is configured to: signal or parse frame identification information for the previous frame.

Clause 17. The device of any of clauses 10-16, wherein the processing circuitry is configured to: parse, from a bitstream, information for the first slice, wherein to encode or decode the first slice, the processing circuitry is configured to entropy decode the information for the first slice based on the entropy coding states of the first slice.

Clause 18. The device of any of clauses 10-16, wherein to encode or decode the first slice, the processing circuitry is configured to entropy encode information for the first slice based on the entropy coding states of the first slice, and wherein the processing circuitry is configured to: signal, in a bitstream, the entropy encoded information for the first slice.

Clause 19. A computer-readable storage medium storing instructions thereon that when executed cause one or more processors to: signal or parse a slice level flag of a first slice, in coding order, of a current frame of point cloud data indicating to determine entropy coding states of the first slice of the current frame based on entropy coding states of a last slice, in coding order, of a previous frame of the point cloud data; determine the entropy coding states of the first slice of the current frame based on the entropy coding states of the last slice of the previous frame in a condition where the flag indicates to determine the entropy coding states of the first slice of the current frame based on the entropy coding states of the last slice of the previous frame; and encode or decode the first slice of the current frame based on the entropy coding states of the first slice.

Clause 20. The computer-readable storage medium of clause 19, wherein the instructions that cause the one or more processors to determine the entropy coding states comprise instructions that cause the one or more processors to copy the entropy coding states of the last slice of the previous frame as the entropy coding states of the first slice of the current frame.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. The term computer-readable medium includes examples where there is a one storage medium or where there are distributed storage media.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding or decoding point cloud data, the method comprising:
   signaling or parsing a first slice level flag of a first slice, in coding order, of a current frame of the point cloud data indicating to determine entropy coding states of the first slice of the current frame based on entropy coding states of a last slice, in coding order, of a previous frame of the point cloud data;
   determining the entropy coding states of the first slice of the current frame based on the entropy coding states of the last slice of the previous frame in a condition where the first slice level flag indicates to determine the entropy coding states of the first slice of the current frame based on the entropy coding states of the last slice of the previous frame;
   encoding or decoding the first slice of the current frame based on the entropy coding states of the first slice; and
   signaling or parsing a second slice level flag of a second slice, in coding order, of the current frame indicating to determine entropy coding states of the second slice of the current frame based on the entropy coding states of the first slice of the current frame,
   wherein the first slice level flag and the second slice level flag are different flags.

2. The method of claim 1, wherein determining the entropy coding states comprises copying the entropy coding states of the last slice of the previous frame as the entropy coding states of the first slice of the current frame.

3. The method of claim 1, further comprising:
   determining that dependent frame entropy coding is enabled for one or more frames,
   wherein signaling or parsing the first slice level flag comprises signaling or parsing the first slice level flag in a condition where dependent frame entropy coding is enabled for one or more frames.

4. The method of claim 3, wherein the first slice level flag comprises a first flag, wherein determining that dependent frame entropy coding is enabled comprises parsing, a second flag, from a parameter set of the one or more frames that indicates that dependent frame entropy coding is enabled for the one or more frames.

5. The method of claim 1, wherein determining the entropy coding states of the first slice of the current frame based on the entropy coding states of the last slice of the previous frame comprises:
   determining entropy coding states of geometry data of the first slice of the current frame based on entropy coding states of geometry data of the last slice of the previous frame; and
   determining entropy coding states of attribute data of the first slice of the current frame based on entropy coding states of attribute data of the last slice of the previous frame.

6. The method of claim 1, further comprising:
   signaling or parsing frame identification information for the previous frame.

7. The method of claim 1, further comprising:
   parsing, from a bitstream, information for the first slice,
   wherein encoding or decoding the first slice comprises entropy decoding the information for the first slice based on the entropy coding states of the first slice.

8. The method of claim 1, wherein encoding or decoding the first slice comprises entropy encoding information for the first slice based on the entropy coding states of the first slice, the method further comprising:
   signaling, in a bitstream, the entropy encoded information for the first slice.

9. A device for encoding or decoding point cloud data, the device comprising:
   one or more memories configured to store the point cloud data; and
   processing circuitry coupled to the one or more memories, wherein the processing circuitry is configured to:
      signal or parse a first slice level flag of a first slice, in coding order, of a current frame of the point cloud data indicating to determine entropy coding states of the first slice of the current frame based on entropy coding states of a last slice, in coding order, of a previous frame of the point cloud data;
      determine the entropy coding states of the first slice of the current frame based on the entropy coding states of the last slice of the previous frame in a condition where the first slice level flag indicates to determine the entropy coding states of the first slice of the current frame based on the entropy coding states of the last slice of the previous frame;
      encode or decode the first slice of the current frame based on the entropy coding states of the first slice; and
      signal or parse a second slice level flag of a second slice, in coding order, of the current frame indicating to determine entropy coding states of the second slice of the current frame based on the entropy coding states of the first slice of the current frame,
      wherein the first slice level flag and the second slice level flag are different flags.

10. The device of claim 9, wherein to determine the entropy coding states, the processing circuitry is configured to copy the entropy coding states of the last slice of the previous frame as the entropy coding states of the first slice of the current frame.

11. The device of claim 9, wherein the processing circuitry is configured to:
    determine that dependent frame entropy coding is enabled for one or more frames, wherein to signal or parse the first slice level flag, the processing circuitry is configured to signal or parse the first slice level flag in a condition where dependent frame entropy coding is enabled for one or more frames.

12. The device of claim 11, wherein the first slice level flag comprises a first flag, wherein to determine that dependent frame entropy coding is enabled, the processing circuitry is configured to parse, a second flag, from a parameter set of the one or more frames that indicates that dependent frame entropy coding is enabled for the one or more frames.

13. The device of claim 9, wherein to determine the entropy coding states of the first slice of the current frame based on the entropy coding states of the last slice of the previous frame, the processing circuitry is configured to:
  determine entropy coding states of geometry data of the first slice of the current frame based on entropy coding states of geometry data of the last slice of the previous frame; and
  determine entropy coding states of attribute data of the first slice of the current frame based on entropy coding states of attribute data of the last slice of the previous frame.

14. The device of claim 9, wherein the processing circuitry is configured to:
  signal or parse frame identification information for the previous frame.

15. The device of claim 9, wherein the processing circuitry is configured to:
  parse, from a bitstream, information for the first slice,
  wherein to encode or decode the first slice, the processing circuitry is configured to entropy decode the information for the first slice based on the entropy coding states of the first slice.

16. The device of claim 9, wherein to encode or decode the first slice, the processing circuitry is configured to entropy encode information for the first slice based on the entropy coding states of the first slice, and wherein the processing circuitry is configured to:
  signal, in a bitstream, the entropy encoded information for the first slice.

17. A non-transitory computer-readable storage medium storing instructions thereon that when executed cause one or more processors to:
  signal or parse a first slice level flag of a first slice, in coding order, of a current frame of point cloud data indicating to determine entropy coding states of the first slice of the current frame based on entropy coding states of a last slice, in coding order, of a previous frame of the point cloud data;
  determine the entropy coding states of the first slice of the current frame based on the entropy coding states of the last slice of the previous frame in a condition where the first slice level flag indicates to determine the entropy coding states of the first slice of the current frame based on the entropy coding states of the last slice of the previous frame;
  encode or decode the first slice of the current frame based on the entropy coding states of the first slice; and
  signal or parse a second slice level flag of a second slice, in coding order, of the current frame indicating to determine entropy coding states of the second slice of the current frame based on the entropy coding states of the first slice of the current frame,
  wherein the first slice level flag and the second slice level flag are different flags.

18. The non-transitory computer-readable storage medium of claim 17, wherein the instructions that cause the one or more processors to determine the entropy coding states comprise instructions that cause the one or more processors to copy the entropy coding states of the last slice of the previous frame as the entropy coding states of the first slice of the current frame.

* * * * *